United States Patent
Brodie et al.

(10) Patent No.: US 12,424,013 B2
(45) Date of Patent: Sep. 23, 2025

(54) IMAGE ENHANCEMENT IN A GENEALOGY SYSTEM

(71) Applicant: Ancestry.com Operations Inc., Lehi, UT (US)

(72) Inventors: Michael Benjamin Brodie, Highland, UT (US); Gopalkrishna Balkrishna Veni, Lehi, UT (US); Jack Reese, Lindon, UT (US); Azadeh Moghtaderi, Kentfield, CA (US); Randon Morford, Saratoga Springs, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 443 days.

(21) Appl. No.: 17/985,070

(22) Filed: Nov. 10, 2022

(65) Prior Publication Data

US 2023/0142630 A1    May 11, 2023

Related U.S. Application Data

(60) Provisional application No. 63/278,004, filed on Nov. 10, 2021, provisional application No. 63/308,579, filed on Feb. 10, 2022.

(51) Int. Cl.
*G06T 5/00* (2024.01)
*G06T 5/50* (2006.01)
*G06V 10/26* (2022.01)
*G06V 30/148* (2022.01)
*G06V 30/414* (2022.01)

(52) U.S. Cl.
CPC .............. *G06V 30/414* (2022.01); *G06T 5/50* (2013.01); *G06V 10/267* (2022.01); *G06V 30/15* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 6,549,646 B1 | 4/2003 | Yeh et al. |
| 7,151,852 B2 | 12/2006 | Gong et al. |

(Continued)

FOREIGN PATENT DOCUMENTS

| | | |
|---|---|---|
| EP | 2370929 A1 | 10/2011 |
| EP | 3276526 A1 | 1/2018 |
| WO | WO 2010/077336 A1 | 7/2010 |

OTHER PUBLICATIONS

Canadian Intellectual Property Office, Office Action, Canadian Application No. 2,906,180, Jul. 24, 2018, 3 pages.

(Continued)

*Primary Examiner* — SJ Park
*Assistant Examiner* — Caroline E. Depalma
(74) *Attorney, Agent, or Firm* — Keller Preece PLLC

(57) ABSTRACT

Methods, systems, and computer-program products for image enhancement include receiving an image and optionally a user request, classify the image, crop image components of the image, restore cropped image components of the image, colorized restored image components, and reconstruct the image from the colorized, restored image components and other components. The other components may include text components that are restored in a separate treatment pipeline.

20 Claims, 17 Drawing Sheets

(56) References Cited

U.S. PATENT DOCUMENTS

| | | |
|---|---|---|
| 7,436,994 B2 | 10/2008 | Huang |
| 7,657,540 B1 | 2/2010 | Bayliss |
| 7,702,145 B2 | 4/2010 | Revow et al. |
| 8,463,554 B2 | 6/2013 | Hon et al. |
| 8,855,935 B2 | 10/2014 | Myres et al. |
| 9,116,882 B1 | 8/2015 | Macpherson et al. |
| 9,390,225 B2 | 7/2016 | Barber et al. |
| 9,501,724 B1 | 11/2016 | Yang et al. |
| 10,296,710 B2 | 5/2019 | Barber et al. |
| 10,318,846 B2 * | 6/2019 | Brown .................. G06F 18/41 |
| 2002/0032687 A1 | 3/2002 | Huff |
| 2005/0147947 A1 | 7/2005 | Cookson et al. |
| 2005/0149497 A1 | 7/2005 | Cookson et al. |
| 2005/0267903 A1 | 12/2005 | Golze |
| 2006/0025929 A1 | 2/2006 | Eglington |
| 2007/0178500 A1 | 8/2007 | Martin et al. |
| 2007/0266003 A1 | 11/2007 | Wong et al. |
| 2008/0027656 A1 | 1/2008 | Parida |
| 2008/0033933 A1 | 2/2008 | Cookson et al. |
| 2008/0081331 A1 | 4/2008 | Myres et al. |
| 2008/0130997 A1 | 6/2008 | Huang et al. |
| 2008/0189047 A1 | 8/2008 | Wong et al. |
| 2009/0299598 A1 | 12/2009 | Boecker et al. |
| 2010/0049736 A1 | 2/2010 | Rolls et al. |
| 2010/0223281 A1 | 9/2010 | Hon et al. |
| 2011/0099193 A1 | 4/2011 | Jensen |
| 2012/0054190 A1 | 3/2012 | Peters |
| 2012/0078503 A1 | 3/2012 | Dzubay et al. |
| 2012/0218289 A1 | 8/2012 | Rasmussen et al. |
| 2014/0006433 A1 | 1/2014 | Hon et al. |
| 2014/0025308 A1 | 1/2014 | Jorde et al. |
| 2014/0082568 A1 | 3/2014 | Hulet et al. |
| 2014/0108527 A1 | 4/2014 | Aravanis et al. |
| 2014/0222792 A1 | 8/2014 | Groeneveld et al. |
| 2014/0278138 A1 | 9/2014 | Barber et al. |
| 2015/0363481 A1 | 12/2015 | Haynes |
| 2016/0048517 A1 | 2/2016 | Jensen |
| 2016/0103950 A1 | 4/2016 | Myres et al. |
| 2016/0212459 A1 * | 7/2016 | Cooper ............ H04N 21/23418 |
| 2016/0342863 A1 | 11/2016 | Kwon et al. |
| 2017/0091692 A1 | 3/2017 | Guo et al. |
| 2017/0109427 A1 | 4/2017 | Izumi et al. |
| 2017/0213127 A1 | 7/2017 | Duncan |
| 2017/0228498 A1 | 8/2017 | Hon et al. |
| 2017/0293861 A1 | 10/2017 | Roy et al. |
| 2017/0329891 A1 | 11/2017 | Macpherson et al. |
| 2018/0181843 A1 | 6/2018 | Brown et al. |
| 2018/0189379 A1 | 7/2018 | Phillips |
| 2020/0257707 A1 | 8/2020 | Folkman et al. |
| 2020/0349674 A1 * | 11/2020 | Ramanujam ............ G06N 5/025 |
| 2020/0394188 A1 | 12/2020 | Roy et al. |
| 2021/0303828 A1 * | 9/2021 | Lafreniere ............ G06V 40/172 |
| 2021/0319003 A1 | 10/2021 | Folkman et al. |
| 2021/0390704 A1 | 12/2021 | Fujimoto et al. |
| 2023/0377095 A1 * | 11/2023 | Xiang .................. G06T 3/4076 |

OTHER PUBLICATIONS

Canadian Intellectual Property Office, Office Action, Canadian Patent Application No. 2,906,180, Sep. 12, 2016, three pages.

Canadian Intellectual Property Office, Office Action, Canadian Patent Application No. 2,906,180, Jun. 21, 2017, four pages.

Chen, M-S et al. "Data Mining: An Overview from a Database Perspective." IEEE Transactions on Knowledge and Data Engineering, vol. 8, No. 6, Dec. 1996, pp. 866-883.

Deng, X. et al. "Automatic Image Cropping with a Single Fully Convolutional Network." ICIMCS '18: Proceedings of the 10th International Conference on Internet Multimedia Computing and Service, Aug. 2018, pp. 1-5.

European Patent Office, Extended European Search Report, European Patent Application No. 14762682.4, Oct. 27, 2016, 10 pages.

European Patent Office, Extended European Search Report, European Patent Application No. 19837768.1, Mar. 1, 2022, nine pages.

Glodzik, D. et al. "Inference of Identity by Descent in Population Isolates and Optimal Sequencing Studies." European Journal of Human Genetics, vol. 21, Jan. 2013, pp. 1140-1145.

Gusev, A. et al. "Whole Population, Genome-Wide Mapping of Hidden Relatedness." Genome Research, vol. 19, Oct. 2008, pp. 318-326.

Huff, C. D. et al. "Maximum-Likelihood Estimation of Recent Shared Ancestry (ERSA)." Genome Research, vol. 21, Feb. 2011, pp. 768-774.

Kim, B. "Interactive and Interpretable Machine Learning Models for Human Machine Collaboration." Dissertation, Massachusetts Institute of Technology, Jun. 23, 2015, pp. 1-143.

Langkvist, M. et al. "Interactive Learning with Convolutional Neural Networks for Image Labeling." International Joint Conference on Artificial Intelligence, Jul. 9-15, 2016, pp. 1-5.

Li, X. et al. "Efficient Identification of Identical-by-Descent Status in Pedigrees with Many Untyped Individuals." Bioinformatics, vol. 26, No. 12, Jun. 2010, pp. i191-i198.

New Zealand Intellectual Property Office, First Examination Report, New Zealand Patent Application No. 629509, Nov. 10, 2015, three pages.

New Zealand Intellectual Property Office, Second Examination Report, New Zealand Patent Application No. 629509, Oct. 6, 2016, three pages.

PCT International Search Report and Written Opinion, PCT Application No. PCT/US2014/030014, Jul. 11, 2014, seven pages.

PCT International Search Report and Written Opinion, PCT Application No. PCT/US2021/036725, Nov. 18, 2021, 15 pages.

PCT International Search Report and Written Opinion, PCT Application No. PCT/US2019/042807, Oct. 2, 2019, 16 pages.

PCT International Search Report and Written Opinion, PCT Application No. PCT/US2020/037888, Aug. 20, 2020, 13 pages.

PCT International Search Report and Written Opinion, PCT Application No. PCT/US2018/056678, Jan. 4, 2019, 11 pages.

Peng, C. et al. "To What Extent Does Downsampling, Compression, and Data Scarcity Impact Renal Image Analysis." arXiv Preprint arXiv:1909.09945v1, Sep. 22, 2019, pp. 1-8.

\* cited by examiner

510    510
*FIG. 5D*    *FIG. 5E*

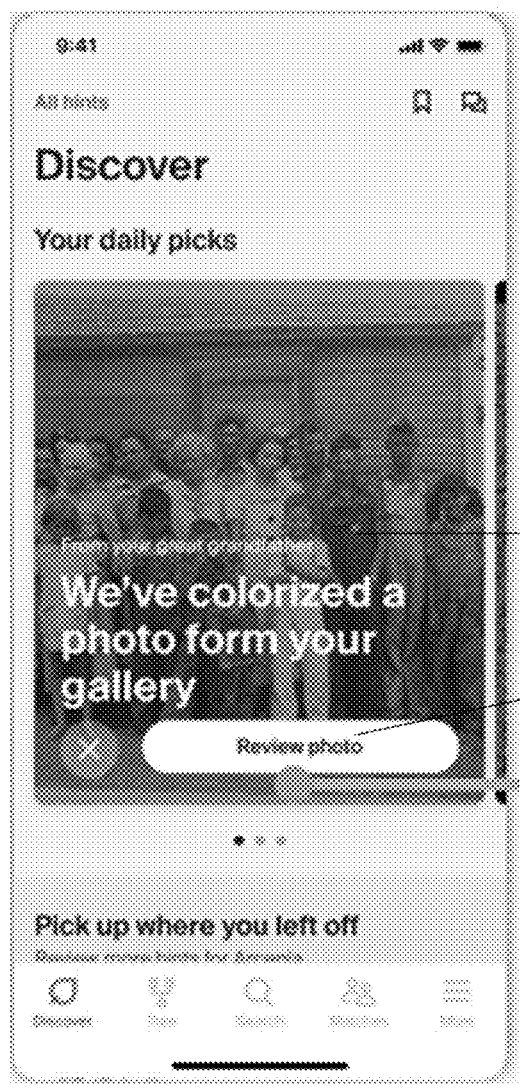
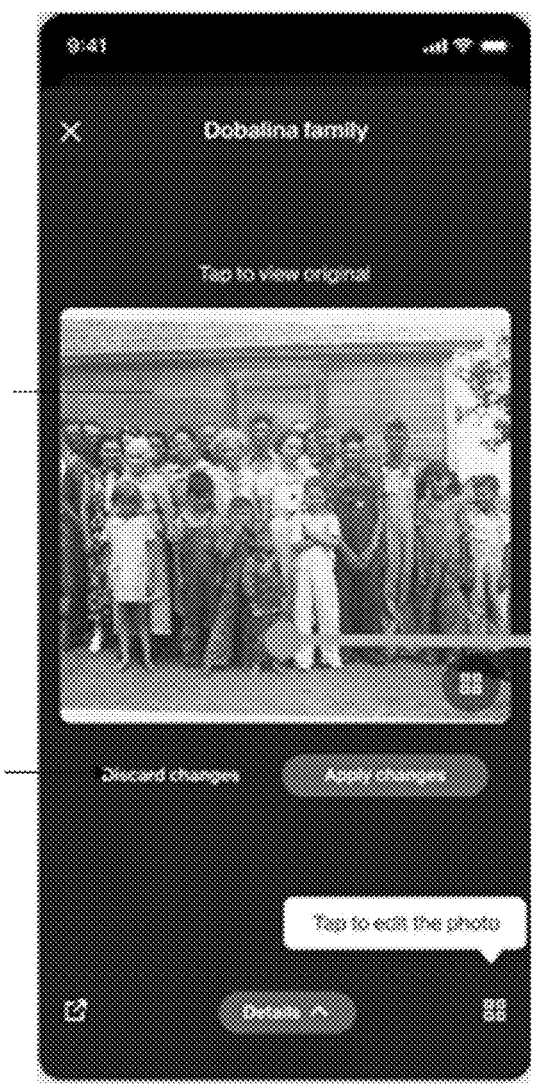
*FIG. 5F*  *FIG. 5G*

IMAGE ENHANCEMENT IN A GENEALOGY SYSTEM

CROSS-REFERENCE TO RELATED APPLICATIONS

The present application claims the benefit of U.S. Provisional Application No. 63/278,004, filed on Nov. 10, 2021, and U.S. Provisional Patent Application No. 63/308,579, filed on Feb. 10, 2022, both of which are hereby incorporated by reference in their entirety.

FIELD

The disclosure relates to systems, computer program products, and/or methods for image enhancement in a genealogy system or other online systems.

BACKGROUND

Genealogical research services comprise images of living and historical persons, often arranged in genealogical trees, and provide users of the genealogical research service with the opportunity to upload photos of themselves, their relatives, and/or their ancestors. This allows users of a network of genealogical trees to search for and become acquainted with potentially related persons in a meaningful way.

However, images such as photos, particularly historical photos, frequently suffer from unsightly degradations and damage such as tears, scratches, creases, noise, and/or poor contrast that limit the ability of users to view, appreciate, share, and utilize information contained in such photos. Old photos are often grayscale (e.g., pure-gray, near-gray, and Sepia) and to the extent that even recently taken photos were taken or developed in color, they have often lost vividity, rendering the photo dull and/or distorted in color. Some images have had the original color distorted during the digitization process. Black and white photos are often difficult for users to emotionally relate to. Further, images of interest are often combined with text and/or other photos, complicating efforts to apply appropriate transformations to the images and text. Manual retouching of photos, usually performed by a specialist, is often labor- and time-intensive, limiting the number of degraded photos that can be restored and enjoyed.

While image colorization and restoration modalities have been attempted, existing approaches to image restoration and colorization procedures are normally attempted separately, are not configured or well-suited to the challenges of historical photos, and have not met with success, including satisfactory accuracy, allowing for user deployment. For example, existing modalities are usually specific to localized defects and are not well-suited to spatially uniform, e.g., global, defects, such as film grain, sepia effect, color fading, etc., and vice versa.

SUMMARY

Disclosed herein relates to a computer-implemented method, including: receiving, by a genealogy server, an image that is digitalized from a physical record, the image associated with a genealogy record or an individual profile of the genealogy server; identifying a sub-region of the image as a target region for image enhancement; classifying that the sub-region includes a type of image component; enhancing the sub-region based on the classified type of the image component to generate an enhanced sub-region, enhancing the sub-region including restoring or colorizing the image component, wherein enhancing the sub-region is performed at least partially by a machine learning model and the machine learning model is trained using a plurality of image records stored in the genealogy server; and merging the enhanced sub-region with one or more other sub-regions or an original version of the image.

In some embodiments, the type of image component is selected from candidate types of image components, the candidate types include a text component, a single image component, a multi-image component, and a face component.

In some embodiments, the image enhancement includes a combination of image enhancing techniques that are selectable by a user via a graphical user interface.

In some embodiments, enhancing the sub-region based on the classified type of the image component includes selecting a set of image processing techniques according to the classified type, wherein the set of image processing techniques is predetermined for the classified type, and applying the set of image processing techniques to the sub-region.

In some embodiments, selecting the set of image processing techniques is further based on a user's request on the image enhancement.

In some embodiments, the machine learning model includes a generative adversarial network that is trained using faux-real images generated by randomly oversaturating real images.

In some embodiments, the computer-implemented method may further include segmenting a text component from an image component of the image; and performing text restoration separately from image restoration and/or colorization.

In some embodiments, enhancing the sub-region including restoring the image component, and restoring the image component includes: determining that a size of the image exceeds a predetermined size threshold; adjusting the size of the image; performing image restoration on the image component; merging restored image component into the original version of the image that has the size adjusted; and restoring an original image size and aspect ratio.

In some embodiments, enhancing the sub-region including performing a facial enhancement, and facial enhancement includes: detecting a face is present in the sub-region; expanding the face; selecting an image-processing machine learning model that is trained specifically for enhancing faces; and enhancing an expanded face using the image-processing machine learning model.

In some embodiments, enhancing the sub-region including colorizing the image component, and colorizing the image component includes: identify a color scheme of the image component; colorizing the image component based on the color scheme.

In some embodiments, the techniques described herein relate to a computer-implemented method, further including: determining that an enhanced image component was cropped from a larger image; merging the enhanced image component into the larger image.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. 5A through 5G are example user interfaces for a user to perform image enhancement, in accordance with some embodiments.

Figure 1:
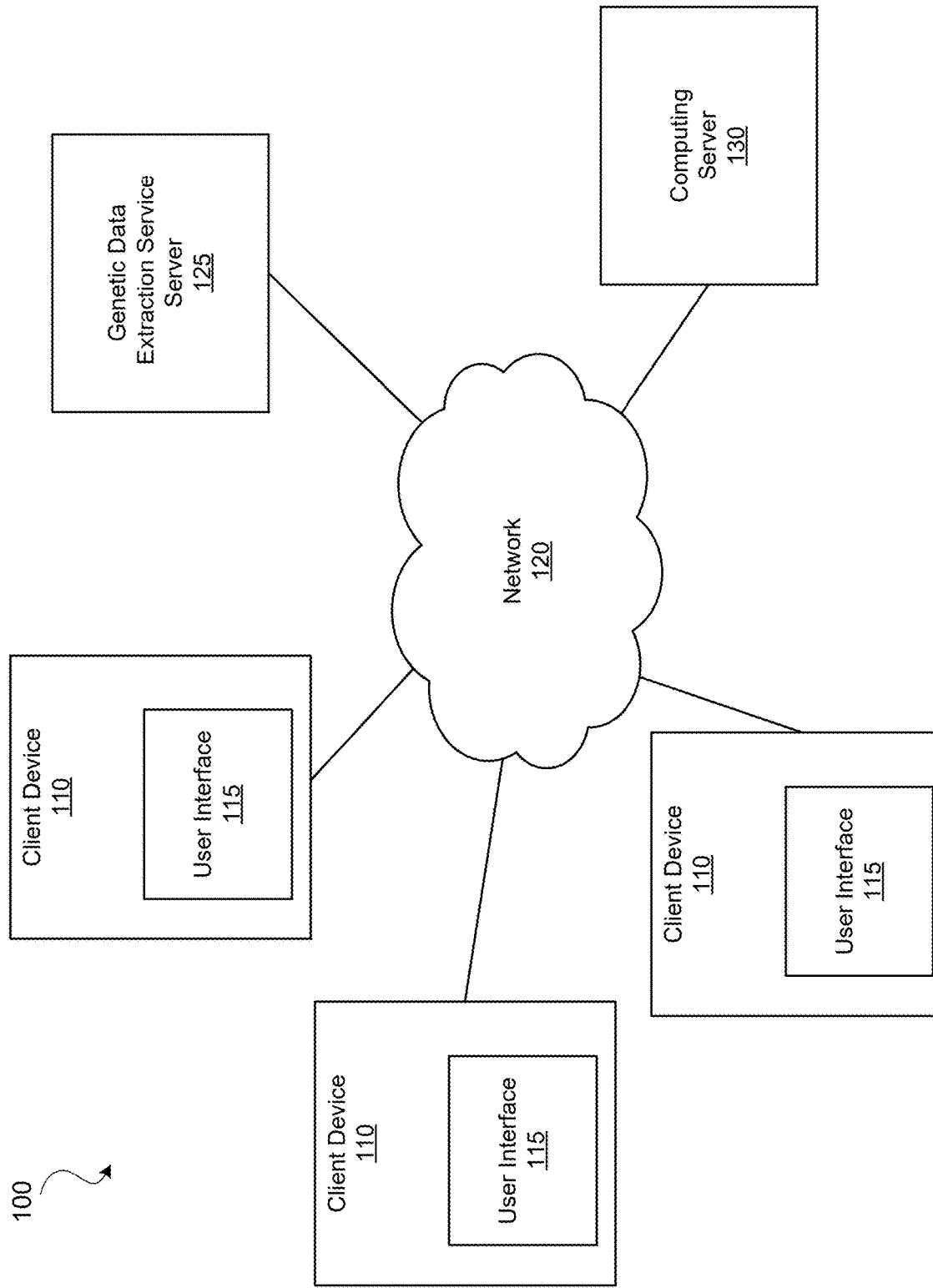
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.
Configuration Overview Embodiments of systems, computer-program products, and methods for image enhancement advantageously address the drawbacks of existing approaches by facilitating image enhancement, for example for old or historical photos.

In some embodiments, a computing server, such as a genealogy system server, may facilitate user upload or other retrieval of an image for various image enhancements. Image enhancements may include restoration, colorization, categorization of the image, text restoration of any text components of the image, cropping or segmentation of mixed text and photo images, cropping or segmentation of multi-photo images, restoration of large-sized images, restoration of damaged (e.g., torn or scratched) images, global restoration of images, face detection within images, face enhancement of detected faces, merging of faces into the original images, detection of a color scheme, determination of whether colorization is required, colorization of images, and/or merging of components of an image back into an original or reconstructed image.

Various image enhancement embodiments described herein advantageously address the limitations of the existing image-restoration and image-colorization approaches. For example, in some embodiments, instead of applying a single image-restoration or image-colorization model across the entirety of an image irrespective of the image contents, as is done in the state-of-the-art approaches and which yields often absurd results, the computing server may apply tailored solutions to specific subsets of regions of an image which are classified, identified, cropped, and later merged.

Further, various image enhancement embodiments advantageously allow for improved enhancements (e.g., restoration and colorization) of faces in images. In some embodiments, faces are detected in an original image, extracted or cropped therefrom, expanded (e.g., to a standard size), enhanced, and resized to be reintegrated into the original image which has been, in parallel, enhanced. The original image that has been enhanced in parallel may be downsampled to improve computing requirements/efficiency and then restored. The image enhancement embodiments thus allow for object-specific enhancements. For example, different models may be applied to pertinent detected objects such as faces, which may be later reintegrated into the image, thus improving the overall results and ensuring that pertinent objects such as faces are not missed and are enhanced, while reducing computing requirements.

In some embodiments, a computing server may receive an image and/or a request from a user. The image may be a historical image, a photo, or any other image. The request may include a user specification of colorization, restoration, both colorization and restoration, or other suitable enhancement requests. The user specification may be made via a user interface specifying toggles or buttons for enhancement. For example, the interface may provide a list of toggles that include restoration, crop, colorization, etc. The user may select restoration only, colorization only or a combination of various restoration techniques.

The computing server may apply a categorization engine to determine a category of the image. For example, the categorization engine may determine that the image include text only, text and photo, photo only such as portraits, group photos, or other images, or other content. The categorization engine may include a historical image classification engine pre-trained on any suitable image and/or text dataset, such as ImageNet. Reference is made to U.S. Pat. No. 10,318,846, granted Jun. 11, 2019, which is incorporated herein in its entirety.

In some embodiments, the categorization engine may utilize a Caffe-based classification model. Additionally or alternatively, the categorization engine may be in real-time or non-real-time as suitable. In other embodiments, the classification module is a PyTorch-based model that is based on pre-existing models included in the PyTorch library.

A task determination engine may determine the downstream engines used to enhance the image. In some embodiments, the determined image category may be added as one of the metadata tag of the image. The image with the category tag and the user request may be input into a task determination engine to determine suitable models and processes used for the enhancing the image. For example, for images categorized as text only, the image and request are input to a text processing engine for text restoration. The text processing engine may utilize a heuristic approach and/or may be neural network-based. The text processing engine may be configured to restore text that has been damaged by the above-mentioned conditions (e.g. cracks, tears, folds, creases, etc.) or that has suffered from writing-specific damage, such as ink-bleed. In some situations, the text may have bleed through, be low-contrast, have text contained inside a photo, signatures, sloppy handwriting, etc. The text processing engine may include super-resolution and/or binarization models.

In some embodiments, the use of a separate text restoration engine downstream of a classification and/or cropping engine allows for text-specific restoration engines to be applied to text components of an input image, as opposed to image- or face-specific restoration engines as is done in existing modalities.

In some embodiments, for images categorized as mixed text and photo images, the image and request may be fed to a cropping engine. Within the cropping engine, the image and request are fed to a text and image cropping engine configured to segment the text component(s) and the image component(s) from the image, with the segmented text component(s) sent to the text processing engine. The segmented image component(s) are sent to a cropping component of the copping engine. The cropping engine may utilize a photo cropping model. For images categorized as photo only, the image and request are sent to a cropping component of the cropping engine.

The cropping component may be configured to crop and segment individual photos from an array of multiple photos, such as a yearbook page, a class directory, a newspaper page, or otherwise. Additionally or alternatively, the cropping component may be configured to improve or clean up a boundary of one or more photos. For example, the cropping component may detect that a boundary of a photo includes unrelated image components, such as white portions of a page from which the photo was initially segmented or other media from which the photo was initially digitized.

It has been found that unwanted/unrelated portions of a page entrained in a border of a cropped image may disrupt the enhancement (e.g., colorization and/or restoration) process on the photo. The cropping component may detect and remove any such portions of the photo. The cropping component may utilize a cropping model applied on an entire multi-photo image, or may crop photos first and then process each cropped photo individually. The cropping component may be trained and utilized to find distinctive boundaries between adjacent photos.

For images categorized as photo only and not in need of cropping, the image is sent to the task determination engine for determining the type of enhance request (e.g., whether the request is for restoration, colorization, or both). The output of the cropping engine is likewise input to the task determination engine for determining the type of enhance request (e.g., whether the request is for restoration, colorization, or both).

For requests that are for restoration only and for requests for both restoration and colorization, the associated image is sent to an image restoration engine. In some embodiments photos are restored prior to colorization, but in other embodiments the photos selected for enhancement may be colorized prior to restoration. In some embodiments, images are restored, then colorized, then restored again.

In some embodiments, the image is first processed in a size-detection engine where images above a predetermined threshold size are filtered and sent to a size management engine before being sent to a scratch-detection engine. In some embodiments, images below the predetermined threshold size are sent directly to the scratch-detection engine.

The provision and use of the size-detection engine may advantageously prevent large images from overflowing memory and other computing resources, such as a GPU. Large images have been found to generate or throw a Compute Unified Device Architecture ("CUDA") memory error, disrupting the enhancement process and entailing increased cost and complexity. In some embodiments, the scratch-detection engine may take the form of a Net-based model.

In some embodiments, the image processed by the scratch-detection engine may be transmitted to an image restore engine where restoration and repair of features like scratches, tears, folds, etc. are rectified. The image restore engine may be a triplet domain translation network configured to resolve both structured degradation and unstructured degradation of the images. The image restore engine may perform various image restoration tasks including treating the entire image or portions of the image to rectify scratches or other damage.

In some embodiments, the image processed by the image restore engine is provided to a face-detection engine, where faces are enhanced. Simultaneously, previously, subsequently, and/or in parallel, original input images and requests are sent directly to the face-detection engine. The face-detection engine is configured to detect one or more faces in the image using a suitable face detection modality, such as a RetinaFace with MobileNet backbone model, a dlib-based model, modifications or combinations thereof, or other suitable model, and in some embodiments to apply or determine a bounding box thereabout. In some embodiments, this advantageously allows for improved, e.g., more robust, detection of faces, including faces that are not completely straightforward or otherwise escape detection by certain face-detection modalities. Detected faces may be cropped or otherwise segmented from the original image.

In some embodiments, the computing server may provide one or more suitable models to expand the detected faces to a predetermined or standard resolution, enhance the detected faces, merge the expanded and enhanced faces into the image restored original image, and restore the image restored image with the expanded and enhanced faces to its original size and aspect ratio. Expanding and enhancing detected faces may be performed using a progressive generator-based model. The generator may be a coarse-to-fine generator configured to translate a low-dimensional code z into corresponding high-resolution and clean faces, where z is a down-sampled patch of the faces.

For example, the progressive generator may be configured to start from a latent vector z, up-sample the feature map progressively by deconvolution, and inject the degraded face into different resolutions in a spatial condition manner. Merging faces into the original image may be performed using a facial landmark registration-based model. For locations that are determined that the faces are not in need of enhancement, the faces may be highlighted within the image with the resulting image output as a final product to a user.

In some cases, certain existing modalities for restoration of photos leave "checkerboard" artifacts on images, due to JPEG lossy compression. This is particularly noticeable in restoration of small images. In some embodiments, a pre-processing step may be performed to smooth and sharpen the images prior to, in parallel with, during, or subsequent to restoration.

By providing a face-detection, expansion, enhancement, and merging function to segment facial regions and remove scratches, tears, and other damages to those regions, in some cases the image size and the computing resources allocated may be reduced without significantly affecting features of the image. In some embodiments, processing and memory requirements, and the associated costs and complexities, are improved while providing improved accuracy of restored images. For example, by segmenting faces and restoring faces separately from the rest of the image, resolution of facial features—which often come out low quality and/or blurry in existing restoration modalities—is improved. In contrast to existing modalities wherein eyes are often not clear in restored images or not properly detected at all, eyes can be restored to a suitable clarity prior to merging the face components back into an image.

In various embodiments, the image enhancement may be a single step process or multiple step process. In some embodiments, a single step of simple quality enhancement may be performed on certain images received by the image restoration engine. Other images may be treated in the image restoration engine in a two-step process, including the simple quality enhancement step plus artifact detection/removal/inpainting. Other images may be treated in the image restoration engine in a five-step process, including the simple quality enhancement step, artifact detection/removal/inpainting, face detection, face enhancement, and face merging.

In some embodiments, for images with expanded and enhanced faces that have been restored to the images' original size and aspect ratio, the images are sent to an auto-enhance determination engine. Images for which a user has requested auto-enhance are passed to a colorization engine. Images for which a user has not requested auto-enhance are instead passed to a merge logic engine. In the colorization engine, images, whether the images have been restored or those are not in need of restoration but rather only of colorization, are passed to a color-scheme identification engine, and thereafter to a colorization requirement determination engine.

The color-scheme identification engine may be a classification engine configured to determine true grayscale, near grayscale, Sepia, color-but-washed-out, and vibrant-color images. In some embodiments, the colorization requirement determination engine may utilize a histogram-based method for determining whether colorization should be performed. In some embodiments, a machine learning model (e.g., a neural network or regression-based model) may be used to predict the probability that an input required colorization. In some embodiments, the computing server may determine the classification of color scheme of the image.

The image with classification may be input to a colorization requirement determination engine. In some embodiments, there may be pre-determined rules on colorization requirement for each classification. For example, in some embodiments, all classifications except for vibrant color images are determined to require colorization. Additionally or alternatively, a colorfulness metric may be determined by converting red-green-blue ("RGB") images into hue-saturation-luminance ("HSL") values. The colorfulness metric may be based on HSL values, particularly saturation, with images having a saturation value above a predetermined threshold. The use of a colorization requirement determination engine advantageously avoids instances of color photos being re-colorized away from the original colors.

The colorization engine receives images for which colorization is determined to be required. The colorization engine may include, in this particular order or in another order, an object detection engine, a colorization engine, an aspect-ratio restoration engine, and a contrast enhancement engine. The object detection engine may, in some embodiments, be integrated with the colorization engine. The engines are configured to detect images upon which colorization is to be performed, colorize the images, return the colorized images to an original aspect ratio, and/or enhance contrast. Colorization may be performed by utilizing an instance-based colorization model, a higher resolution instance-based colorization model, or any other suitable modality. Colorization may also be performed at one or more image resolutions, as well as on adjacent, non-overlapping crops. These pieces may thereafter be combined via image stitching and histogram matching, which may be performed using any suitable computer-vision algorithms, neural network-based approachs, or otherwise.

In some embodiments, near grayscale and sepia images are transformed to true grayscale before colorization. This may reduce the incidence of "tie-dye" effects.

The colorization model may be fine-tuned, for example with an augmented training dataset, to address problems of existing colorization modalities producing color bleed and/or unnatural coloration. The dataset may include images with tears, scratches, ink blotches, or other artifacts of interest. In some embodiments, the dataset may include colorized images plus corresponding black and white and sepia versions for training.

The colorization engine may be configured to receive input images and to perform one or more of the following operations/steps. An auto-contrast step may be performed. Face detection may be performed on the images. Simultaneously, in parallel, subsequently, and/or previously to face detection, the image may be resized to a predetermined size, such as 256×256, 512×512, 1024×1024, or otherwise. The image resizing may be based on a ratio of detected faces to the width/height of the input images, and/or the ratio of the file size to an image height/width compression statistic. This may advantageously expedite processing requirements.

Recolorization of the image is performed by a machine learning model, such as a deep learning model like a generative adversarial network ("GAN"). The GAN is trained using a novel loss setup. A traditional GAN loss entails a generator that creates fake images in contrast to real images provided in a training dataset. The GAN further includes a discriminator that attempts to accurately distinguish real from fake images.

The GAN used in various embodiments may have certain improvements over conventional GANs. Conventional GANs are highly unstable and prone to failure without correct precautions. The novel colorization model of some embodiments herein, by contrast, advantageously utilizes a variational-autoencoder ("VAE") model as the generator. The VAE is configured with an encoder, configured to receive images and output corresponding encodings, and a generator configured to receive the encodings and to output corresponding generation outputs, such as colorized versions of the input images. The generator model may include one or more residual blocks, which may comprise two sub-blocks that each include a convolutional layer, normalization layer, and a point-wise, non-linear activation layer. In some embodiments eight or more residual blocks are provided to map an image into a latent embedding space.

Thereafter, one or more residual decoder blocks map the latent embedding back to an image, but with color. The discriminator may be a neural network such as a VGG16 or VGG16-based network trained to determine a loss between the generated images and real images. While a VAE-based model is described, in some embodiments a conventional or modified GAN model, Naïve Bayes, Latent Dirichlet Allocation, Gaussian Mixture Model, Restricted Boltzmann machine, Deep Belief Network, modifications and/or combinations thereof, or any other suitable model may also be used. For example, one or more convolutional neural networks ("CNN") may be provided as the generator and/or the discriminator. In some embodiments, a classification model is provided for the discriminator.

In some embodiments, the novel loss setup includes a faux-real image generated by randomly oversaturating each real image by a predetermined amount, for example between 15% and 85%. The amount by which the faux-real images are oversaturated may be random or may be according to any other suitable determination. It has been found that too small of a range (e.g. 15-25% oversaturation) results in the discriminator quickly learning to recognize fake images 100% of the time, which cuts off the requisite learning signal to the generator. By contrast, too high of a range (e.g. 60-80% oversaturation) has been found to too-frequently encourage the discriminator to consider oversaturated images as real images, which is also bad for learning, as anything the generator produces will too-often be considered real.

The faux-real image is used alongside the real and the fake images to train the novel GAN, with the discriminator tasked with rejecting fake images but to accept both real and faux-real images. This may prevent the discriminator from learning to discriminate too easily and/or quickly between fake and real inputs, in which situation the generator is cut off from the discriminator's gradient signal that provides information needed to improve the realism of fake outputs.

By contrast, the faux-real image keeps the discriminator from learning to perfectly identify the class of inputs. The oversaturation mimics the look of fake images—which often have undersaturated or oversaturated colors—and will confuse the discriminator during training. However, the random variation of oversaturation allows the discriminator to improve, which leads to steady improvement in both the generator and the discriminator without the loss of input signal to the generator.

It has been found that for "large" images (e.g., images with a resolution greater than or equal to 800×800), particularly if the aspect ratio/size is too large, color bleeding and/or some parts of the image not getting colorized may occur. In that situation, nothing may be colorized in or colors may be unnatural. It has also been found that for "small" images (e.g., images with a resolution less than or equal to 400×400), there is often color bleed or not much color added. High-quality small images are added to the dataset to finetune the colorization engine to mitigate the issues of color bleed and not much color being added.

The GAN may be trained using a dataset comprising color images, such as jpgs, with a variety of compression ratios. This advantageously prepares the model for a wide range of possible input qualities and compression artifacts. In some embodiments, the initial dataset include approximately 50,000 images obtained from a network of genealogical trees with associated photos, which was augmented using approximately 1,800 hand-picked high-resolution images.

In some embodiments, a reference image known to pertain to a particular image may be utilized to guide colorization. This allows the model to more-accurately map the user's skin tones, eye color, hair color, make-up style, apparel, etc. to an ancestor. References images may be obtained from a network of genealogical trees, such as a stitched tree database, in which genealogical information for a user and other tree persons, such as the user's ancestors and relatives, is frequently paired with photos.

The stitched tree database may be the stitched tree database described in U.S. Patent Application Publication No. 2021/0319003, filed Jul. 22, 2019, U.S. Patent Application Publication No. 2020/0257707, filed Oct. 19, 2018, U.S. Patent Application Publication No. 2020/0394188, filed Jun. 15, 2020, U.S. Pat. No. 10,296,710, granted May 21, 2019, which are hereby incorporated by reference in their entirety. In some embodiments, when providing a request for colorization or restoration, the UI may be configured to solicit a user's input regarding an ancestor of whom the image is being enhanced, and subsequently parse, identify, and retrieve a reference image from a related tree person, such as a parent, child, or sibling with whom at least one facial image is associated.

Alternatively, or additionally, the reference image may be determined from an outside source, based on user uploads, or any other sources. Multiple reference images may be retrieved. The reference image may be used to train a specific instance of the GAN model for colorization, the specific instance being targeted to the particular input image.

The use of face detection in the colorization engine advantageously allows for face-specific training and/or transformation, which can facilitate the use of reference photos from, for example, a descendant of a person of interest in an image, such that skin tone, hair color, and other face-specific features are used to train the specific instance of the GAN without generating noise due to different hair styles, clothing styles, etc.

Colorized images are fed to a merge-logic engine where the merge-logic engine determines whether the images were cropped from a larger image, such as a yearbook page, family history book, newspaper page, or otherwise. In the cases where the restored and/or colorized images were cropped from other components such as other photos and/or text, the images are fed to a merge engine configured to reassemble the original image. Reassembled images, colorized images that were not cropped from a larger image, and restored images not in need of colorization are output to a user as a final result.

The combination of a cropping engine and a merge logic engine upstream and downstream, respectively, of the restore and/or colorization engines, advantageously facilitates tailored treatments for specific components of an image to be enhanced, allowing for improved results for each component, e.g., text, image, etc.

In some embodiments, a user is provided with selectable options for repairing an image. For example, the user may be presented with a selection of an appropriate colorization model with examples provided on references images. In some embodiments, the user may select a "gentle" restore or an "aggressive" restore.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. The computing server 130 may also preform image enhancement for various photos uploaded by users. Depending on the embodiments, the computing server 130 may also be referred to as an online server, a personal genetic service server, a genealogy server, a family tree building server, a social networking system, and an image enhance engine. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

The user interface 115 may also allow user to upload an image for image enhancement. The user may select different image enhancement option via the user interface 115.

Example Computing Server Architecture

Figure 2:
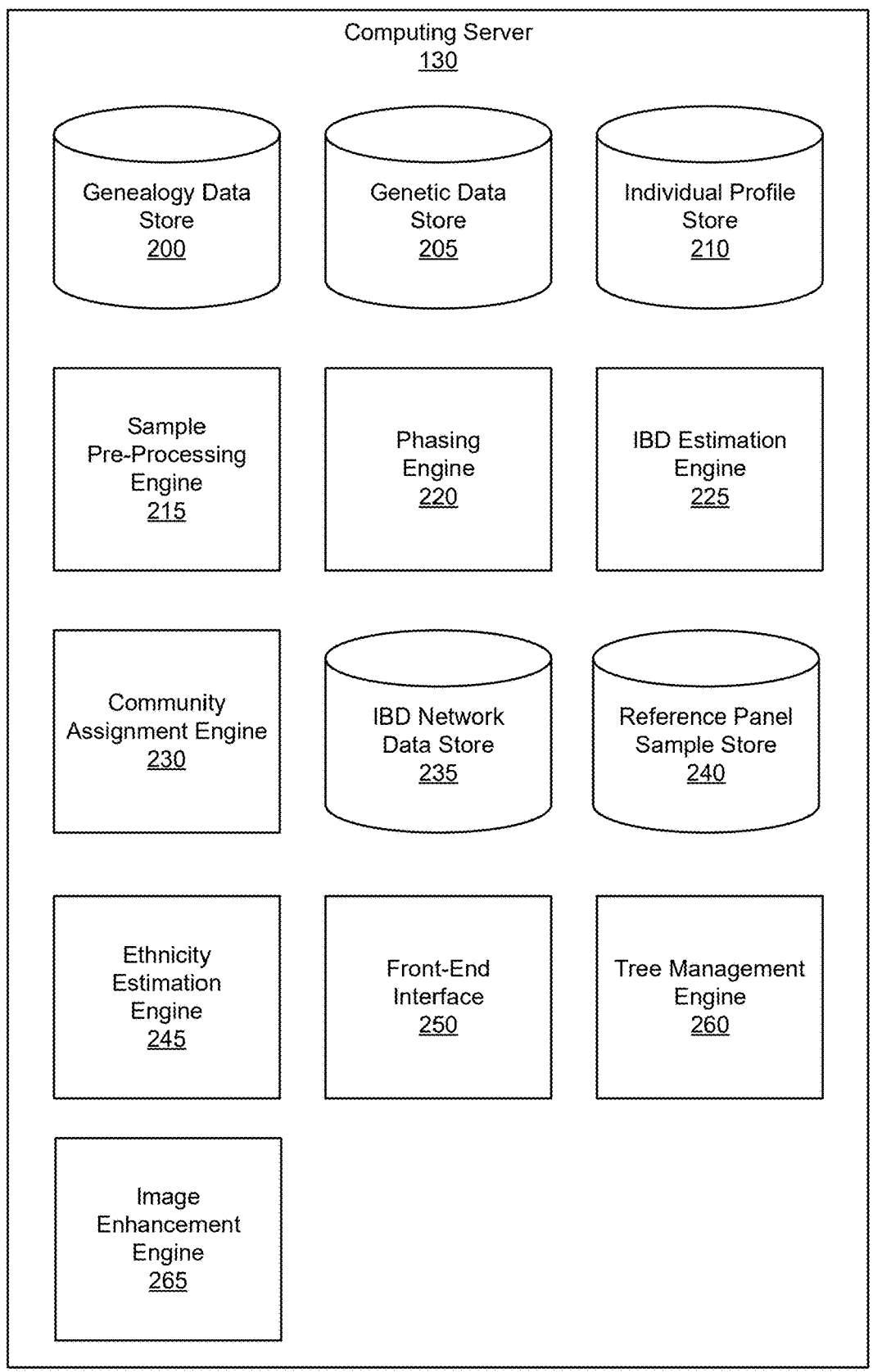
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, a tree management engine 260, and an image enhancement engine 265. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and DNA test takers in the potential family trees through one or more machine learning models or other heuristic algorithms. For example, the tree management engine 260 may try putting the target individual in various possible locations in the family tree and determine the highest probability position(s) based on the genetic datasets of the target individual and other DNA test takers in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

The image enhancement engine 265 may enhance images in various ways. The images enhanced by the image enhancement engine 265 may be received from various different sources. For example, a user of the computing server 130 may upload a photo to serve as a photo that is associated with an individual profile stored in the individual profile store 210. The individual profile may be the user's own profile, a public profile, a historical person profile, or an ancestor or relative's profile. The photo may also be linked to a family tree. In some embodiments, a user of the computing server 130 may upload a photo to associate the photo to a record stored in the genealogy data store 200. For example, a photo may be uploaded as a complement of a marriage record, a military record, etc. In some embodiments, instead of being uploaded by a user, the photo may be downloaded from the Internet or scanned from a historical record. For example, the photo may be included in a historical document (e.g., a census record, a marriage record) or be the record itself. In some embodiments, the photo may be old records that are scanned from books, newspapers, or other printings and publications. An image provided to the image enhancement engine 265 may be a historical image that is digitalized from a physical record. For example, the image may be a scan of a historical photo or a record documentation.

The image enhancement engine 265 receives the photo and perform various image enhancement automatically or based on the user's choice of enhancement options. The detailed structure and processes used by the image enhancement engine 265 are discussed further below throughout this disclosure. While in this disclosure the image enhancement engine 265 is discussed to be used with a genealogy system as a primary example, in various embodiments the image enhancement engine 265 may be a standalone engine or may be used for any online system, such as a social network system, a content distribution system, an image sharing site, a historical image archive system, or any suitable online system that is genealogy related or not. The various image processing techniques used in this image enhancement engine 265 may also be separated used in various embodiments. Systems and methods for image enhancement may be provided for users of any application and/or for any type of image processing and/or enhancement purposes, and are not limited to photos, genealogical information, or otherwise. For example, the disclosed embodiments may be used for enhancement of damaged, old photos, enhancement of contemporary photos or other images, or otherwise.

Example Image Enhancement Process

Figure 3:
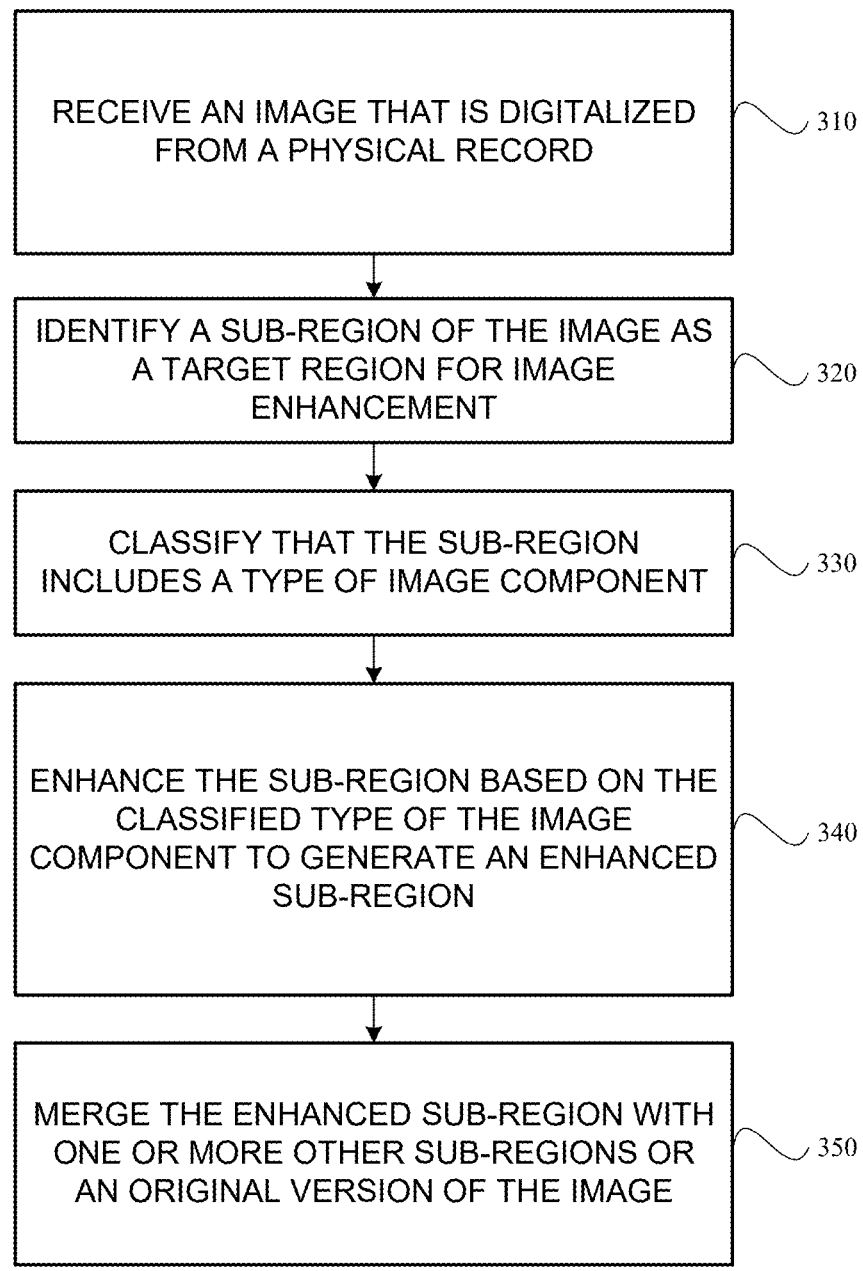
FIG. 3 is a flowchart depicting an example process for performing image enhancement, in accordance with some embodiments.

FIG. 3 is a flowchart depicting an example process 300 for performing image enhancement, in accordance with some embodiments. The process 300 may be performed by a computing device, such as computing server 130 or a component of the computing server 130, such as the image enhancement engine 265. The process 300 may be embodied as a software algorithm that may be stored as computer instructions that are executable by one or more processors. The instructions, when executed by the processors, cause the processors to perform various steps in the process 300. Throughout this disclosure, while an image that is digitalized from a physical record is used as an example, various processes and architectures in this disclosure, including the process 300 and discussion in the subsequent figures, such as an example architecture of the image enhancement engine 265 discussed in FIG. 4A through FIG. 4D, may also be used for other types of images without the loss of generality. Likewise, while the computing server 130 that may serve as a genealogy server is used as the example of a computing device that is used to perform the process 300, another suitable computing device may also be used for the image enhancement process.

In some embodiments, the computing server 130 may receive 310 an image. The computing server 130 may receive the image from various sources, as discussed in the image enhancement engine 265. In some embodiments, an image provided to the image enhancement engine 265 may be a historical image that is digitalized from a physical record. The image may be associated with a genealogy record or an individual profile of the genealogy server. For example, a user may upload the image and ask the computing server 130 to link the image to an individual profile or to a genealogy record. For example, the genealogy record, such as a marriage record, may document a historical event. The image may be an actual photo taken at the marriage ceremony and the user may ask the computing server 130 to link the image to the marriage record. In another example, the image may be a photo of an ancestor. A user may upload the image and ask the computing server 130 to link the image to the profile of the ancestor or family tree that includes the ancestor.

In some embodiments, the computing server 130 may identify 320 a sub-region of the image as a target region for image enhancement. The sub-region may be a portion of the image or the entirety of the image. The computing server 130 may divide the image into segments based on the types of objects presented in the images. An image could include a mix of text and image, a combination of multiple images (e.g., the uploaded file being a post that includes multiple images), a single image with no margin, or any combination of images, text, and margins. In the case where the computing server 130 identifies that the image is in fact a single image without a margin, the sub-region may be the entirety of image. However, in some embodiments, even for a single image without a margin, the computing server 130 may still segment the image into sub-regions in certain situations when certain objects are detected, for example, where one or more faces are detected.

In some embodiments, the computing server 130 may classify 330 that the sub-region includes a type of image component. The type of image component may be selected from candidate types of image components. For example, the candidate types may include a text component, a single image component, a multi-image component, and a face component. The types of image components may further be divided based on the types of objects presented in an image. For example, the types of objects may include landscape, building, persons, faces, and other objects. In some embodiments and as discussed in further detail below, the computing server 130 may train one or more machine learning models that are specialized in certain types of objects for image enhancement.

In some embodiments, the computing server 130 may enhance 340 the sub-region based on the classified type of the image component to generate an enhanced sub-region. The image enhancement may include a combination of image enhancing techniques that are selectable by a user via a graphical user interface, such as the user interface 115. The computing server 130 may select a set of image processing techniques according to the classified type. In some embodiments, the set of image processing techniques may be predetermined for the classified type. For example, if the image component is identified as a text component, a predetermined set of text processing techniques will be applied. Likewise, if the image component is identified as a face. A predetermined set of processing techniques that specialize for enhancing facial images may be applied. Enhancing the sub-region may include restoring or colorizing the image component. In some embodiments, enhancing the sub-region is performed at least partially by a machine learning model. In some embodiments, the machine learning model is trained using image records stored in the genealogy server.

In some embodiments, the computing server 130 may merge 350 the enhanced sub-region with one or more other sub-regions or an original version of the image. For example, multiple sub-regions may be segmented. A specialized set of image processing techniques may be applied on each sub-region (e.g., text enhancement for text sub-region, facial image enhancement for a sub-region that includes a face, etc.). The enhanced sub-regions may then be merged to form an output image.

Example Image Enhancement Engine Structure

FIG. 4A through FIG. 4D, combined, are block diagrams illustrating an example pipeline of a computing device that can be used for performing image enhancement, in accordance with some embodiments. The architecture 400 illustrated in FIG. 4A through FIG. 4D may be an example pipeline for the image enhancement engine 265. The architecture 400 may be an example architecture that can be used to perform the process 300. In various embodiments, an image enhancement pipeline may include additional, fewer, or different engines or components. Also, while there are some discussions on the order of the engines in the architecture 400, in some embodiments, the orders of processing and engines may also be changed. The images in architecture 400 may be processed by different techniques. The resultant images, whether they are input, intermediate, or final, may be referred to as a version of the image. For example, each of input image 401, input image 404, uncropped images 417, restored text images 423, images 424, restored images 445, bypass images 473, bypass images 474, colorized images 471, etc. are examples of a version of the image.

Figure 4A:
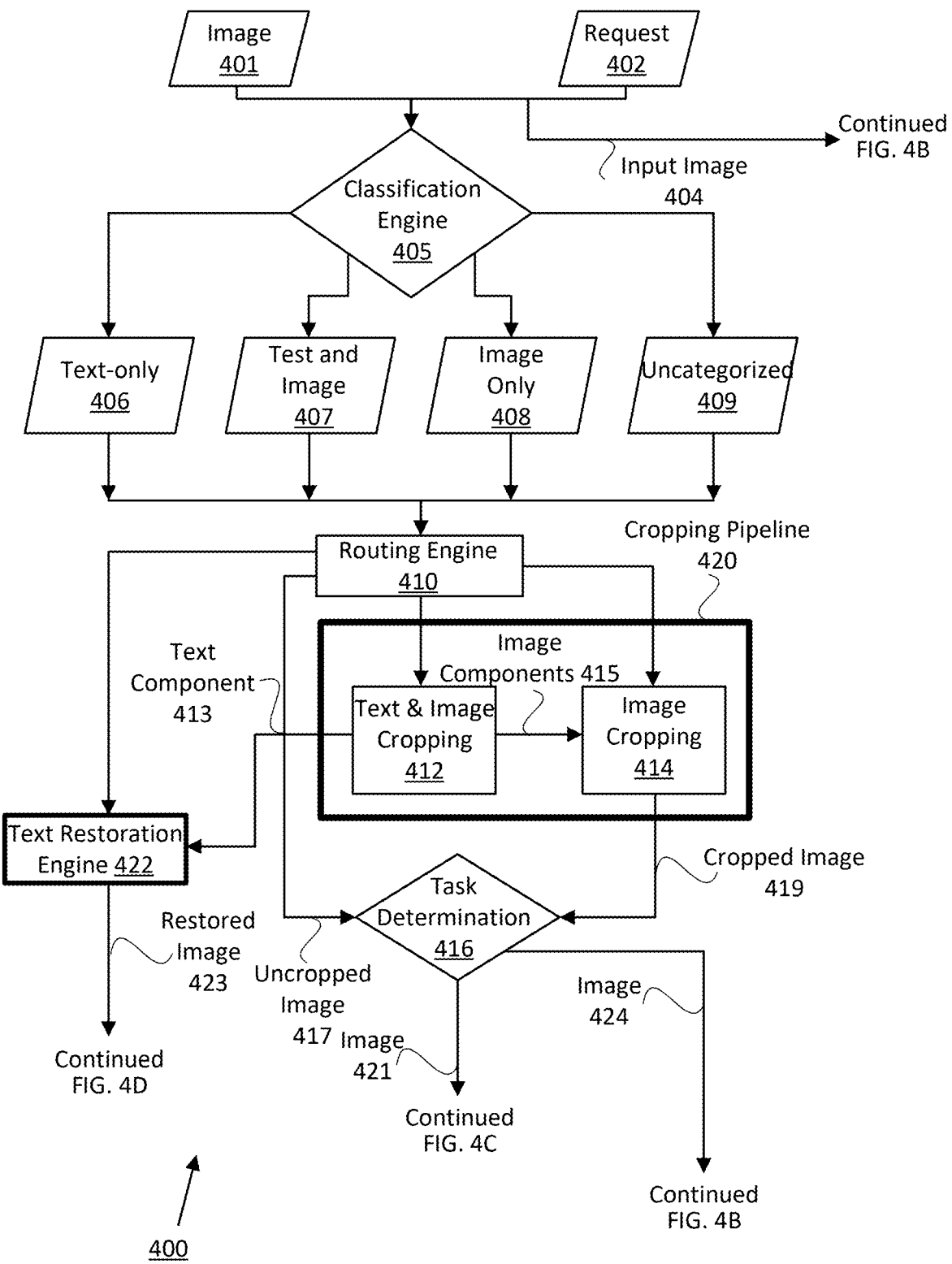
FIG. 4A through FIG. 4D, combined, are block diagrams illustrating an example pipeline of a computing device that can be used for performing image enhancement, in accordance with some embodiments.
Figure 4B:
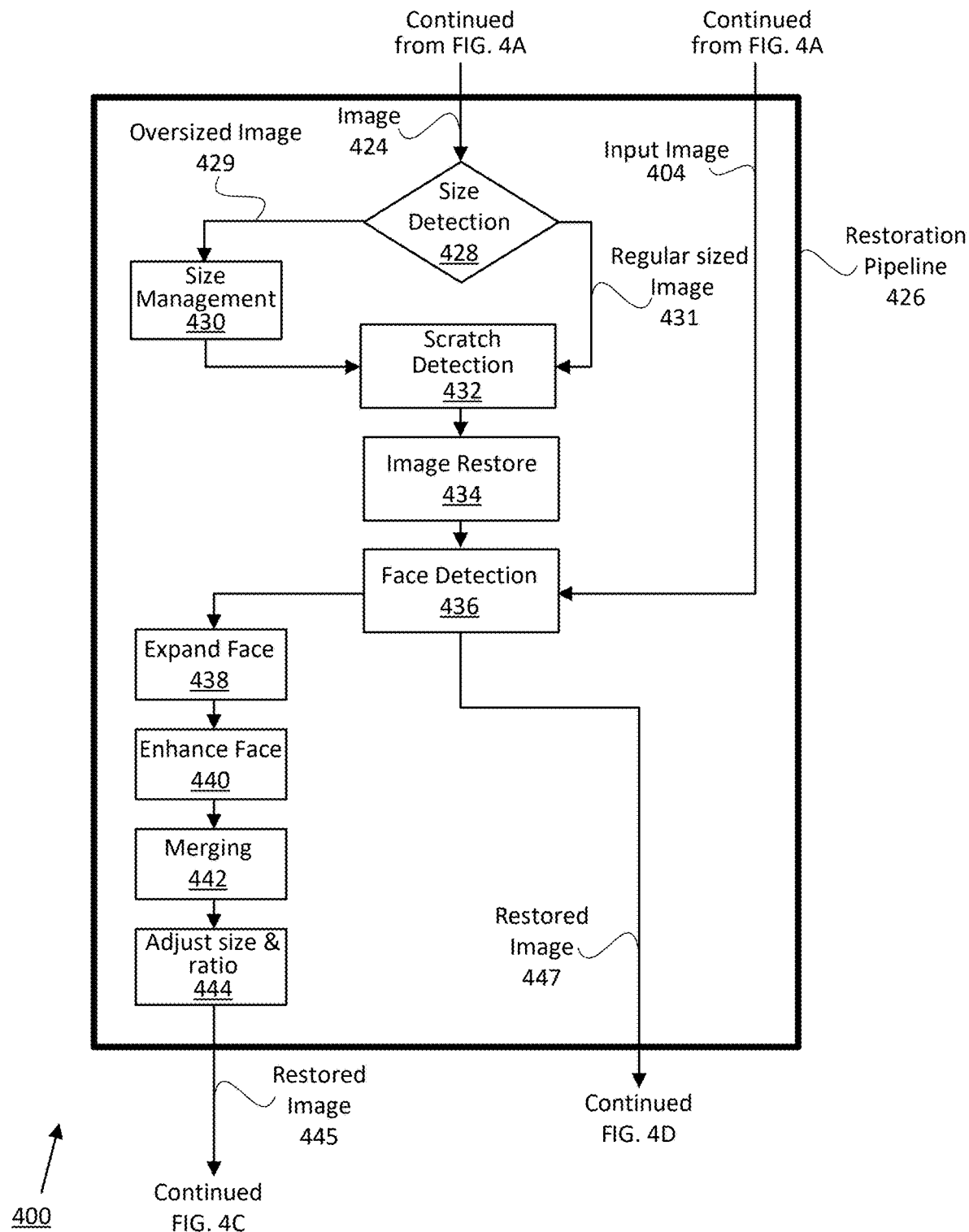

Turning to FIG. 4A, part of the architecture 400 of an image enhancement pipeline is provided, in accordance with some embodiments. An input image 401 and an optionally a corresponding request 402 are provided. The input image 401 and corresponding request 402 may be submitted by a user, such as through a user interface, or may be automatically retrieved. The input image 401 may be a historical image, old photo, or other image for which enhancement is desired. At classification engine 405, the input image 401 is classified. For example, the classification engine 405 may include one or more components that are described in U.S. Patent Application Publication No. 2018/0181843A1, filed Dec. 28, 2016, or a modification thereof. The Application Publication is incorporated by reference herein for all purposes.

The input image 401 may be classified by the classification engine 405 to be, e.g., a text-only image 406, a mixed text-and-image image 407, an image-only image 408, or an uncategorized/uncategorizable image 409. After being so classified, the images 406, 407, 408, and 409 are sent to a routing engine 410 for directing the images to an appropriate engine. For example, the routing engine 410 may receive the image 401, the request 402, and the classification determined at classification engine 405. Where images 401 are classified as text-only images 406, the image 401 is directed to a text restoration engine 422. Where images 401 are classified as text-and-image images 407, image-only images 408, and/or uncategorized images 409, the images 401 are directed to a cropping pipeline 420.

The text restoration engine 422 may utilize a heuristic approach and/or may be neural network-based. The text restoration engine 422 may be configured to restore text that has been damaged by the above-mentioned conditions (e.g. cracks, tears, folds, creases, etc.) or that has suffered from writing-specific damage, such as ink-bleed. In some situations, the text may have bleed through, be low-contrast, have text contained inside an image, signatures, sloppy handwriting, etc. The text restoration engine 422 may comprise super-resolution and/or binarization models.

In some embodiments, the text restoration engine 422 may be configured to normalize input pixels values to a predetermined range, for example from 0 to 4. The image is brightened by multiplying the pixels by a predetermined value. In some embodiments, the predetermined value is 2.5, but other values are contemplated. It has been surprisingly found that 2.5 advantageously has favorable results across many different image types. A fast-fourier-transform ("FFT") of a grayscale original, non-brightened image is performed. As necessary, the original image may be converted to grayscale prior to the FFT performance or other steps. In some embodiments, only the low-frequency components of the FFT-performed image are retained.

In a subsequent step, the FFT output is subtracted from the brightened image. Values below 0 or above 1 are truncated. For example, anything below 0 is set to 0, and anything above 1 is set to 1. Then the image is normalized again between 0 and 1. Restored text images 423 may be sent to the pipeline shown in FIG. 4D.

The cropping pipeline 420 may include a text and image cropping engine 412 configured to segment the text component(s) 413 and the image component(s) 415 from the image 401, with the segmented text component(s) 413 sent to the text restoration engine 422. In some embodiments, a segmentation engine such as that described in U.S. patent application Ser. No. 17/343,626, filed Jun. 9, 2021, which is incorporated herein in its entirety by reference, or a modification thereof, may be utilized for objection detection and segmentation in the text-and-image cropping engine 412. The segmented image component(s) 415 are sent to an image cropping engine 414 of the cropping pipeline 420. The image cropping engine 414 may utilize a photo cropping model. For images categorized as photo only 408, the image 401 and request 402 are sent to the image cropping engine 414 of the cropping pipeline 420.

The cropping engine 414 may be configured to crop and segment individual images from an array of multiple images and other objects, such as photos in a yearbook page, a class directory, or otherwise. Additionally or alternatively, the cropping engine 414 may be configured to improve or clean up a boundary of one or more images. For example, the cropping engine may detect that a boundary of an image includes unrelated image components, such as portions of a page from which the image was initially segmented or other media from which the image was initially digitized.

Unwanted portions may disrupt the colorization and/or restoration process on the image. The image cropping engine 414 may detect and remove any such portions of the photo. The image cropping engine 414 may be utilize a cropping model applied on an entire multi-image image, or may crop images first and then process each cropped image individually. The image cropping engine 414 may be trained and utilized to find distinctive boundaries between adjacent photos. In one embodiment, the image cropping engine 414 utilizes a gradient change to determine the crop. For example, the cropping boundary is applied to non-solid boundaries around images to ensure that only or substantially only the image itself is being included in the cropped image, without unwanted boundaries.

It has been surprisingly found that applying the image cropping engine 414 on images advantageously improves downstream restoration and/or colorization efforts, as noise introduced by image borders, whitespace, and other components that are cropped by the image cropping engine 414 degrade performance of restoration and colorization engines. The performance of such models is advantageously improved using the image cropping engine 414, thus minimizing the cost and complexity of an image enhancement process as described.

Cropped images 419 from the image cropping engine 414, and uncropped images 417, such as images categorized as photo only and not in need of cropping, are sent to a task determination engine 416 for determining whether the request is for restoration, colorization, or both. Images 421 for which restoration is not specified may be sent to a pipeline shown in FIG. 4C, whereas images 424 for which restoration is specified may be sent to the pipeline shown in FIG. 4B.

For requests 402 that are for restoration only and for requests 402 for both restoration and colorization, the associated image 401 is sent to a restoration pipeline 426. That is, in some embodiments images are restored prior to colorization, but in other embodiments the images selected for enhancement may be colorized prior to restoration. The image is first processed in a size-detection engine 428 where oversized images 429 above a predetermined threshold size are filtered and sent to a size management engine 430 for downsampling the image before being sent to a scratch-detection engine 432. Regularly sized images 431 below the predetermined threshold size are sent directly to the scratch-detection engine 432.

The provision and use of the size-detection engine 428 may advantageously prevent large images from overflowing memory and other computing resources, such as a GPU, for example. Images are sent from the scratch-detection engine 432, which may be a UNet-based model, to an image restore engine 434 where restoration and repair of features like scratches, tears, folds, etc. are rectified. The image restore engine 434 may be a triplet domain translation network.

Images are sent from the image restore engine 434, in which the entire image is treated to rectify scratches or other damage, to a face-detection engine, where faces—which command users' attention—which may have been separately, e.g., in parallel, enhanced, can be seamlessly added back into the image restored image, e.g., to align with the detected faces in the image restored image. That is, simultaneously, previously, subsequently, and/or in parallel, input images and requests are sent directly to the face-detection engine 436. The face-detection engine 436 is configured to detect one or more faces in the image using a suitable face detection modality, such as a dlib-based and/or a Retina-Face-based model, e.g., with a MobileNet backbone model.

One or more suitable models are provided for, in turn, expanding 438 detected faces e.g., detected images from the original images, enhancing 440 the detected faces, merging 442 the expanded and enhanced faces into the restored image from the image restore engine 434, and returning the image with the expanded and enhanced faces to its original size and aspect ratio 444. The restored images 445 may be passed to the pipeline shown in FIG. 4C.

Expanding 438 and enhancing 440 detected faces may be performed using a progressive generator-based model. Merging 442 the expanded and enhanced faces into the original image may include warping the enhanced faces according to any suitable image processing techniques. Merging 442 faces into the original image may be performed using a facial landmark registration-based model, e.g., with particular landmarks, such as eyes or edges of eyes, aligned across images. Where it is determined that the faces are not in need of enhancement, the faces may be detected and/or highlighted within the image with the restored image 447 outputted as a final product to a user.

It has been found that users are particularly sensitive to the quality of restoration/colorization on faces, which raises the minimum acceptable quality required of the images comprising faces. However, it has also been found that enhancing large images can easily overrun the memory of a system, computer-program product, or other device performing image enhancement. Thus the current size-management approach to prevent memory overruns, which includes the use of the size-management engine 430, can, in the case of large images (e.g., high-resolution images) comprising comparatively small face(s), such as in a digitized yearbook page, result in a downsampled image at 432 with such small faces that even if such faces are detected, state-of-the-art restoration and/or colorization approaches cannot satisfyingly restore and/or colorize the faces of the image without significant distortions, errors, and other unwanted artifacts. This leaves a user feeling, on balance, dissatisfied with the results of the image enhancement process irrespective of how well other elements of the image are enhanced.

It has been surprisingly found, however, that by providing a distinct pipeline of original images 401 from which face(s) can be detected 436, cropped, expanded 438 (e.g., to a standard or predetermined size), and enhanced 440, and thereafter merged back with or within the separately processed and sometimes downsampled images processed within the restoration pipeline 426, the problem of faces being difficult to accurately restore is advantageously addressed. Merged, restored images facilitate the accurate restoration and/or colorization of images irrespective of the size of face(s) therein. This approach also advantageously allows for face-specific restoration and/or colorization to be performed without noise or interference from background imagery or other objects in the photo adversely affecting the performance of the pertinent model. This provides improved image-enhancement results, e.g., results based on tailored application of models/modalities to specific image components such as faces, while improving (e.g., reducing) the required computing requirements.

In some embodiments, the original image 401 may be input directly as input image 404 to the restoration pipeline 426, separately from and/or in parallel to the intermediate images 424. The original images 401 sent directly as input image 404 to the restoration pipeline 426 may advantageously be sent to a face detection engine 436 for determination of a bounding box around face(s) in the images. This allows for cropping, expanding 438, and/or enhancing 440 the face(s) from the original image.

It has been found that certain existing image processing techniques for restoration of photos leave "checkerboard" artifacts on images, due to JPEG lossy compression. This may be particularly noticeable in restoration of small images. In some embodiments, a preprocessing step is performed to smooth and sharpen the images prior to, in parallel with, during, or subsequent to restoration. In some embodiments, the image is upsampled four times, a blur is applied using a Gaussian 4×4 kernel, and then the image is downsampled, for example to 2-3 times the original size. It has been found that this approach advantageously addresses the issue of checkerboard patches.

By providing face-detection 436, expansion 438, enhancement 440, merging 442, and resizing 444 to segment facial regions and remove scratches, tears, and other damage to those regions, it has been found that image size may be reduced without significantly affecting features of the image. Thus, processing and memory requirements, and the associated costs and complexities, are improved while providing improved accuracy and quality of restored images.

For example, by segmenting faces and restoring faces separately from the rest of the image, resolution of facial features—which often come out low quality and/or blurry in existing restoration modalities—is improved. Thus, in contrast to existing modalities wherein eyes are often not clear in restored images, eyes can be restored to a suitable clarity prior to merging the face components back into an image.

In some embodiments, a single step of simple quality enhancement may be performed on certain images received by the restoration pipeline 426. Other images may be treated in the restoration pipeline 426 in a two-step process, including the simple quality enhancement step plus artifact detection/removal/inpainting. Other images may be treated in the restoration pipeline 426 in a five-step process, including the simple quality enhancement step, artifact detection/removal/inpainting, plus face detection, face enhancement, and face merging.

In some embodiments, a light restore option may be used prior to, during, in parallel to, subsequent to, in combination with, or in any other suitable fashion with regards to the restoration steps performed in the restoration pipeline 426. For example, a light restore option—configured to reduce compression artifacts such as blocking artifacts, ringing effects, and blurring—may be performed immediately upstream of the restoration pipeline 426, immediately following the image restore engine 434, immediately following the face detection engine 436, combinations thereof, or in any other suitable location. Light restore may be performed at multiple locations within the pipeline, as an alternative to entire engines (such as an alternative to the restoration pipeline 426), or otherwise as suitable.

Likewise, light restore may be performed immediately upstream of the colorization pipeline 452, within the colorization pipeline 452, or otherwise. The light restore engine may comprise a deep convolution network, such as an artifacts reduction convolutional neural network ("AR-CNN"), fast AR-CNN, a super resolution convolutional neural network ("SRCNN"), deeper SRCNN, a deep convolutional network ("DCN"), combinations and/or modifications thereof, or any other suitable approach.

The use of a light restore engine as described above advantageously reduces the incidence of compression artifacts in images, reduces noise generally, and facilitates color enhancement.

A challenge in applying restoration engines for restoring images with tears, scratches, spot regions, and other damage is that certain artifacts within the image can be lost. For example, a restoration engine may mistake a necklace worn by a person in a photo as a tear or crease in the photo and "repair" the necklace such that the necklace no longer appears in the restored image at all. Similar effects have been observed with buttons, handkerchiefs, jewelry, lapel pins, clothing features or patterns, and other objects.

It has been found that by applying a circularity-based measure on certain regions in the restored images, with only regions that pass a predetermined and/or empirically chosen circularity threshold being retained, this problem can be overcome. The restoration pipeline 426, in particular the image restore engine 434, may be adjusted and/or retrained to include a circularity measure with an empirically determined threshold of 0.5, in some embodiments. The threshold may be more or less as suitable. By applying the circularity-based measure, it has been surprisingly found that artifacts that would otherwise be lost can be retrieved in the restored image.

In some embodiments, the circularity-based measure may be tuned or adjusted to preserve objects/artifacts of varying shapes, aspect ratios, and/or orientations. The parameters of the circularity-based measure may be tuned or adjusted automatically, e.g., using algorithms such as machine-learned models, or interactively by a user-operator. The circularity-based (and/or, in some embodiments, eccentricity-based) measure may be applied directly on a mask image representing the detected scratches/tears to be restored. In some embodiments, the measure may be a circularity-based measure, an eccentricity-based measure, combinations or modifications thereof, or other measure. The measure may be applied directly to the original image, to both the original and mask images, or otherwise.

In some embodiments, a machine learning model may be trained to detect frequently disappearing artifacts. Such artifacts may include buttons, necklaces, jewelry, and other features. The machine learning model may be trained to pre-detect such items in an original image. Then the regions of these objects may be used to tune, e.g., fine tune, the performance of the model in the vicinity of such objects.

In other embodiments, a user interface may be configured to facilitate interactive restoration of images. A user may be allowed to select objects that disappeared in a restored image, e.g., by clicking thereon, in an original image and/or in a mask image. The mask image may be a mask showing the difference between the before and after images. Connected components analysis and/or circularity/eccentricity-based measures may be used to identify the extent of the object of interest that was erroneously removed so as to continuously improve the performance of the image enhancement embodiments and minimize the degree of user interaction required to achieve desired results.

The machine learning model may be a suitable object detection model. In some embodiments, separate models may be trained and utilized in tandem, in parallel, and/or in sequence to retain specific disappearing objects, for example a model for buttons and a model for jewelry. Any object that is erroneously removed can be targeted using a specific model and/or a model trained to retain a plurality of objects.

Training data/images for the model(s) may be obtained from any suitable source and in any suitable number. The object-detection machine learning model may be used to detect one or more objects, and then pass the object-detection and localization information for objects to be retained to a restoration model such that the restoration model can be more careful and/or so that the restoration model can dial down its sensitivity in areas or features of an image likely to contain real objects.

Figure 4C:
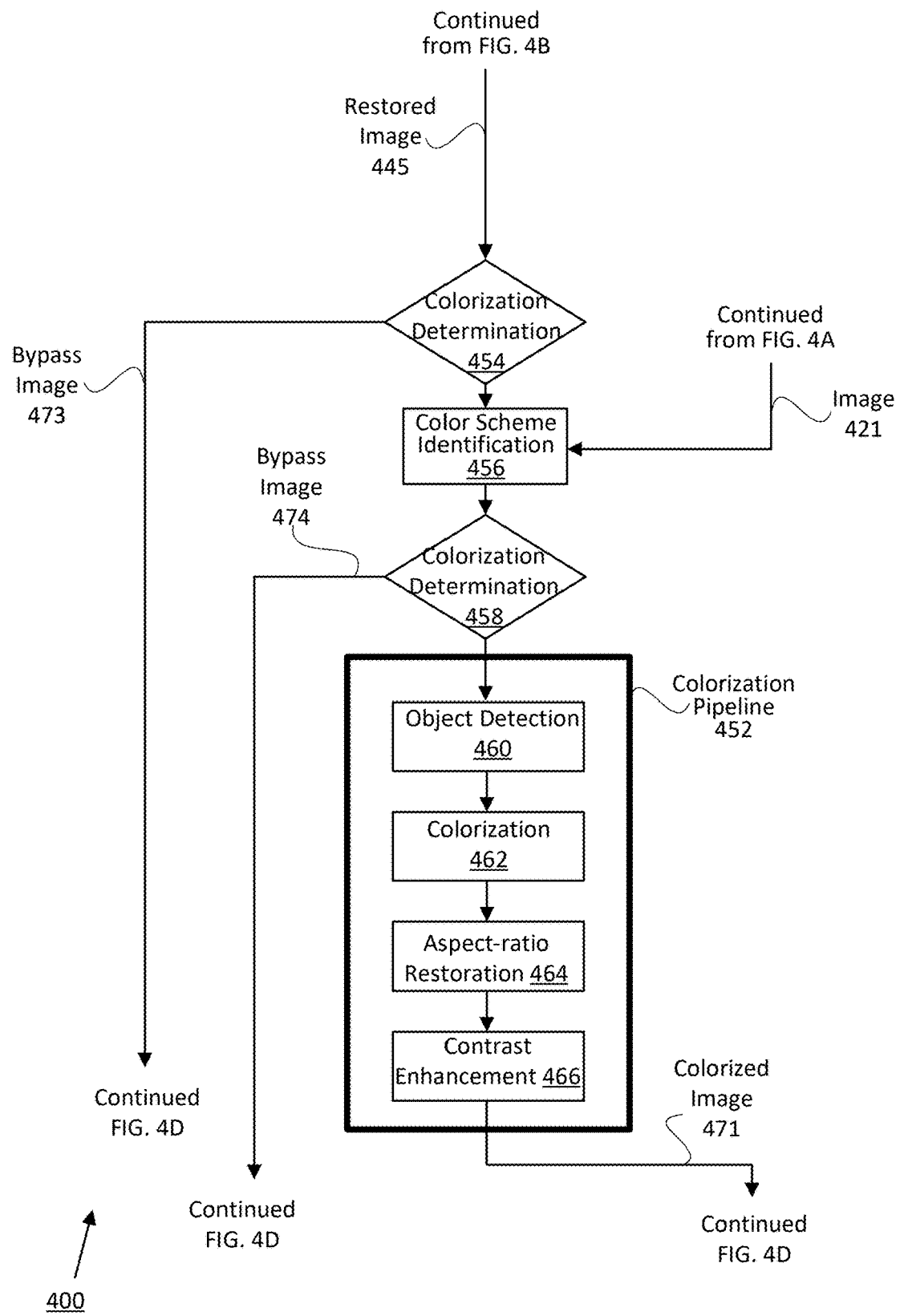

Turning to FIG. 4C, the restored images 445 are sent to a colorization determination engine 454 for determining whether colorization is to be performed. Bypass images 473 for which colorization has not been specified are sent to a merge logic engine shown and described in FIG. 4D. A color-scheme identification engine 456 for color-scheme identification may be a classification engine configured to determine true grayscale, near grayscale, Sepia, color-but-washed-out, and vibrant color images.

A colorization determination engine 458 for determining whether images require colorization receives the classified images. The colorization requirement determination engine 458 may utilize a histogram-based method for determining whether colorization should be performed. In other embodiments, a neural network and/or regression-based model may be used to predict the probability that an input required colorization. In some embodiments, all classifications determined at color-scheme identification engine 456 except for vibrant color images are determined to require colorization. Bypass images 474 not requiring colorization are sent the merge logic engine described and shown in FIG. 4D.

Additionally or alternatively, a colorfulness metric may be determined by converting red-green-blue ("RGB") images into hue-saturation-luminance ("HSL") values. The colorfulness metric may be based on HSL values, particularly saturation, with images having a saturation value above a predetermined threshold. The use of a colorization requirement determination engine advantageously avoids instances of color photos being colorized away from the original colors.

For images determined to require colorization, the images are sent to a colorization pipeline 452. In some embodiments, the colorization pipeline 452 may include, in order or not, an object detection engine 460, a colorization engine 462, an aspect-ratio restoration engine 464, and a contrast enhancement engine 466. The object detection engine 460 may, in some embodiments, be integrated with the colorization engine 462. The engines 460, 462, 464, 466 are configured to detect images upon which colorization is to be performed, colorize the images, return the colorized images to an original aspect ratio, and/or enhance contrast. Colorization may be performed by utilizing an instance-based colorization model, a higher resolution instance-based colorization model, or any other suitable modality. Colorization may also be performed at one or more image resolutions, as well as on adjacent, non-overlapping crops. These pieces may thereafter be combined via image stitching and histogram matching, which may be performed using any suitable computer-vision algorithm, neural network-based approach, or otherwise.

In some embodiments, near grayscale and sepia images are transformed to true grayscale before colorization. It has been found that this reduces the incidence of "tie-dye" effects. In some embodiments, grayscale images are projected to sRGB space using CIE 1931 RGB channel weightings. The CIE 1931 RGB weightings may include, for a grayscale image, 0.2125R+0.7154G+0.0721B, where R, G, and B are the RGB channels in the color image. This method better reflects how humans perceive these colors; for example, green is better captured by and more noticeable to the eye than is blue.

The colorization engine 462 may be fine-tuned, for example with an augmented training dataset, to address problems of existing colorization modalities producing color bleed and/or unnatural coloration. The dataset may include images with tears, scratches, ink blotches, or other artifacts of interest. In some embodiments, the dataset may include colorized images plus corresponding black and white and sepia versions for training.

The colorization engine 462 may be configured to receive input images and to perform one or more of the following operations/steps. An auto-contrast step is performed. Face detection is performed on the images. Simultaneously, in parallel, subsequently, and/or previously to face detection, the image may be resized to a predetermined size, such as 256×256, 512×512, 1024×1024, or otherwise. The image resizing may be based on a ratio of detected faces to the width/height of the input images, and/or the ratio of the file size to an image height/width compression statistic. This may advantageously reduce and/or optimize processing requirements.

Colorization of the image may be performed by a machine learning model, such as a deep learning model like a generative adversarial network ("GAN"). The GAN is trained using a novel loss setup. A traditional GAN loss entails a generator that creates fake images in contrast to real images provided in a training dataset. The GAN further includes a discriminator that attempts to accurately distinguish real from fake images. In practice, however, traditional GANs are highly unstable and prone to failure without correct precautions.

The novel colorization model of embodiments of the disclosure, by contrast, advantageously utilizes a variational-autoencoder ("VAE") model as the generator. The VAE is configured with an encoder, configured to receive images and output corresponding encodings, and a generator configured to receive the encodings and to output corresponding generation outputs, such as colorized versions of the input images. The generator model may comprise one or more residual blocks, which may comprise two sub-blocks that each include a convolutional layer, normalization layer, and a point-wise, non-linear activation layer. In some embodiments eight or more residual blocks are provided to map an image into a latent embedding space.

Thereafter, one or more residual decoder blocks map the latent embedding back to an image, but with color. The discriminator may be a neural network such as a VGG16 or VGG16-based network trained to determine a loss between the generated images and real images. While a VAE-based model is described, it will be appreciated that a traditional or modified GAN model, Naïve Bayes, Latent Dirichlet Allocation, Gaussian Mixture Model, Restricted Boltzmann machine, Deep Belief Network, modifications and/or combinations thereof, or any other suitable model may be used. For example, one or more convolutional neural networks ("CNN") may be provided as the generator and/or the discriminator. In some embodiments, a classification model is provided for the discriminator.

In some embodiments of the disclosure, the novel loss setup includes a faux-real image generated by randomly oversaturating each real image by a predetermined amount, for example between 15% and 85%. The amount by which the faux-real images are oversaturated may be random or may be according to any other suitable determination. It has been found that too small of a range (e.g., 15-25% oversaturation) results in the discriminator quickly learning to recognize fake images 100% of the time, which cuts off the requisite learning signal to the generator. By contrast, too high of a range (e.g. 60-80% oversaturation) has been found to too-frequently encourage the discriminator to consider oversaturated images as real images, which is also bad for learning, as anything the generator produces will too-often be considered real.

The faux-real image is used alongside the real and the fake images to train the novel GAN, with the discriminator tasked with rejecting fake images but to accept both real and faux-real images. This has been found to prevent the discriminator from learning to discriminate too easily and/or quickly between fake and real inputs, in which situation the generator is cut off from the discriminator's gradient signal that provides information needed to improve the realism of fake outputs.

By contrast, the faux-real image keeps the discriminator from learning to perfectly identify the class of inputs. The oversaturation mimics the look of fake images—which often have undersaturated or oversaturated colors—and will confuse the discriminator during training. However, the random variation of oversaturation allows the discriminator to improve, which leads to steady improvement in both the generator and the discriminator without the loss of input signal to the generator.

It has been found that for "large" images (e.g., images with a resolution greater than or equal to 800×800), color bleeding and/or some parts of the image not getting colorized in, particularly if the aspect ratio/size is too large, has been observed. In that situation, nothing may be colorized in or colors may be unnatural. It has also been found that for "small" images (e.g. images with a resolution less than or equal to 400×400), there is often color bleed or not much color added. High-quality small images are added to the dataset to finetune the colorization engine to mitigate the issues of color bleed and not much color being added.

The GAN may be trained using a dataset comprising color images, such as jpgs, with a variety of compression ratios. This advantageously prepares the model for a wide range of possible input qualities and compression artifacts. In one implementation, the initial dataset comprised approximately 20,000 images obtained from a network of genealogical trees with associated photos, which was augmented using approximately 1,800 hand-picked high-resolution images.

In some embodiments, a reference image known to pertain to a particular image may be utilized to guide colorization. This allows the model to more-accurately map the user's skin tones, eye color, hair color, make-up style, apparel, etc. to an ancestor. References images may be obtained from a network of genealogical trees, such as a stitched tree database, in which genealogical information for a user and other tree persons, such as the user's ancestors and relatives, is frequently paired with photos.

The stitched tree database may be the stitched tree database described in U.S. Patent Application Publication No. 2021/0319003, filed Jul. 22, 2019, U.S. Patent Application Publication No. 2020/0257707, filed Oct. 19, 2018, U.S. Patent Application Publication No. 2020/0394188, filed Jun. 15, 5020, U.S. Pat. No. 10,296,710, granted May 21, 2019, which are hereby incorporated by reference in their entirety.

In some embodiments, when providing a request 402 for colorization or restoration, the UI may be configured to solicit a user's input regarding an ancestor of whom the image is being enhanced, and subsequently parse, identify, and retrieve a reference image from a related tree person, such as a parent, child, or sibling with whom at least one facial image is associated.

In other embodiments, the reference image may be determined from an outside source, based on user-input/upload, or any other source. A plurality of reference images may be provided and/or retrieved. The reference image may be used to train a specific instance of the GAN model for colorization, the specific instance being targeted to the particular input image.

The use of face detection in the colorization engine advantageously allows for face-specific training and/or transformation, which can facilitate the use of reference photos from, for example, a descendant of a person of interest in an image, such that skin tone, hair color, and other face-specific features are used to train the specific instance of the GAN without generating noise due to different hair styles, clothing styles, etc.

In some embodiments, an instance-aware image colorization model may be used and/or configured to perform object detection at 460, crop out every detected instance (e.g., object of interest) using determined bounding boxes, colorize each identified instance using a colorization network at 462, and fuse all instances' feature maps with an extracted full-image feature map in every layer. Such a model may be InstColorization available from Su et al. In other embodiments, the colorization engine may utilize Colorful Image Colorization available from Richard Zhang et al. An image whereupon object detection, cropping bounding boxes, individually coloring identified and cropped instances, and fusing of instances' feature maps with a full-image feature map has been performed may be restored to an original aspect ratio at 464 and/or have contrast enhanced at 466 as suitable. Other steps, including sharpening steps or any other suitable step, may likewise be performed.

In particular, during inference the colorization engine may concatenate identical copies of a grayscale image (such as a pseudo-RGB image made up of three gray channels), in some embodiments three identical copies, as input to the colorization engine. This provides a three-channel grayscale image as input. Whereas based on training data an existing colorization engine would predict pixel intensities that align with the formula 0.2125R+0.7154G+0.0721B, the novel approach of embodiments alters this to 1.0R+1.0G+1.0B. It has been surprisingly found that this advantageously reduces many of the unnatural colors observed in output images of existing colorization models. In some embodiments, the RGB channels are weighted further using the mean RGB computed over the training data, which further reduces unnatural colorizations.

In some embodiments, the colorization engine may only be configured (without retraining) to handle 256×256-sized images. In colorization models that process images in CEILAB ("L*a*b*") space, L* (corresponding to lightness) can be treated as the image details, and channels a*, b* can be treated as the colors of the image. Using input L* (a gray image), the model may generate the a*, b* channels at a lower resolution, which are upsampled to match the original resolution. Thereafter the original input L* is merged with the upsampled a*, b* channels to generate an L*a*b* image. This may be converted to RGB space.

By contrast, InstColorization-based approaches may take a grayscale image as an input and output a 256×256-sized RGB image. This generally is smaller than, and does not retain the original proportions of, the input image. This is corrected in some embodiments by rescaling the RGB output to match the input image, converting the RGB to L*a*b*, swapping the original grayscale input with the L channel, and then converting back to RGB.

In some embodiments, the colorization engine 462 is configured to facilitate identification of faces, in some embodiments using a separate face-detection modality as described above regarding the image restoration pipeline 426. In some embodiments, faces are detected in the image at 460 and upsampled and/or restored using a suitable modality. Upsampled and/or restored faces may then be reintegrated or merged with an original, separately processed image.

In other embodiments, the user interface is configured to allow for user participation in the colorization process. For example, the user may be provided with a colorized image 471, and be allowed to select one of the detected objects from within the colorized image, such as a hat, a building, a shirt, or other object, and specify an appropriate color therefor. For example, a user may notice that a colorized black-and-white photo of a parade down Main Street in their hometown shows a building with brown brick (as determined by the colorization engine) instead of the actual red brick, and can opt to change the color scheme for said building. In some embodiments, the user is provided with a limited number of color options for a particular object from which the user may select.

In some embodiments, colorized images 471 may be passed through the restoration pipeline 426 after colorization to brighten details and/or further enhance the image in view of the colorization effects. In some embodiments, the colorized images 471 may alternatively or additionally be resized and/or sharpened after colorization.

Figure 4D:
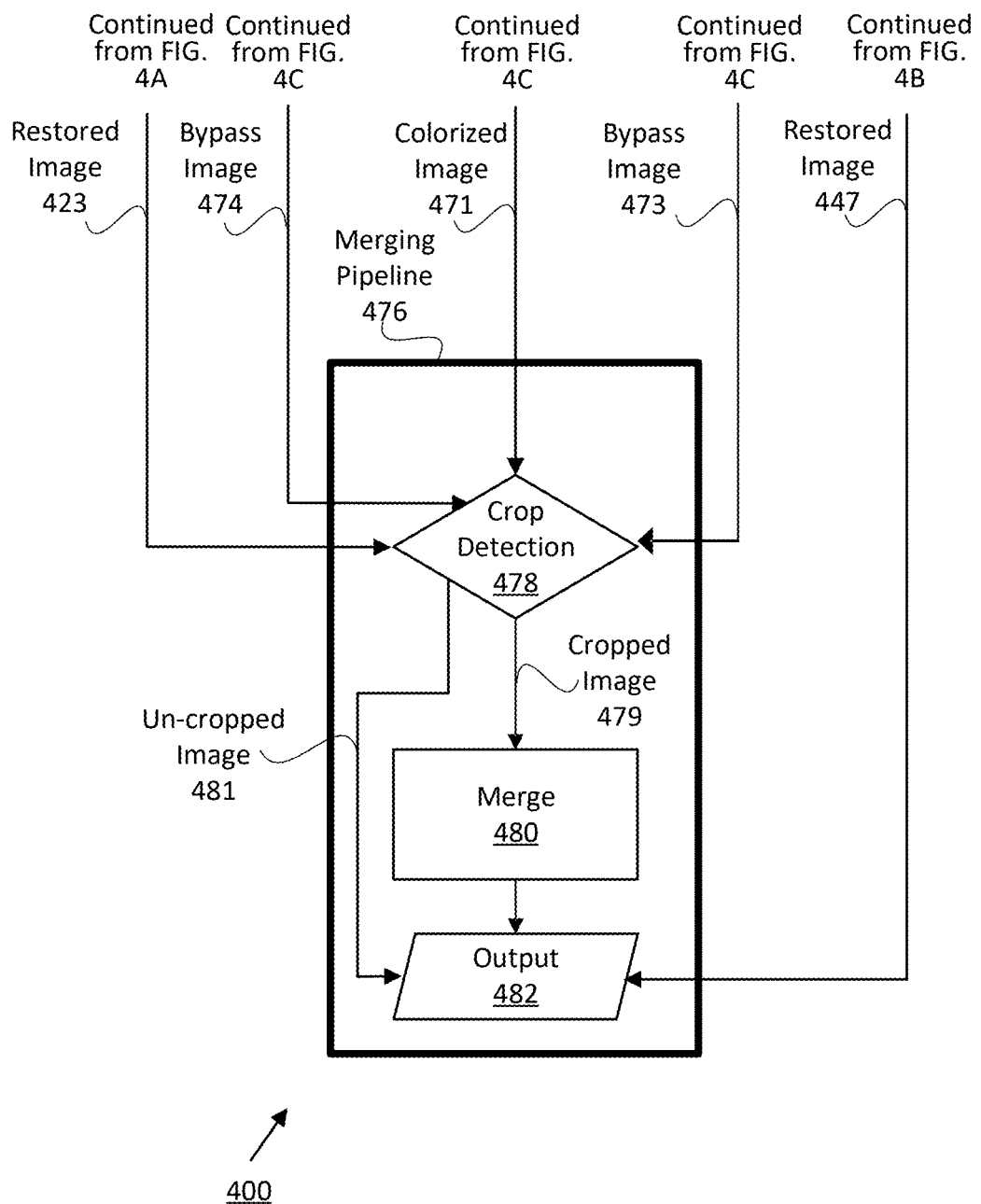

Colorized images 471 are passed to the merge logic engine shown in FIG. 4D, along with bypass images 473 or 474 for which colorization is not required or specified. The merging pipeline 476 receives colorized images 471 from the colorization pipeline 452, images 474 for which colorization is not required, restored text images 423, restored images for which colorization is not specified by the user, and images 474 whereupon faces have been highlighted. The merging pipeline 476 is configured with a crop detection engine 478 for determining whether an image was cropped from a larger image. For cropped images 479 that are determined to have been cropped from a larger image, the cropped images 479 are passed to a merge engine 480. Un-cropped images 481 determined to not have been cropped from a larger image are returned as output 482 to the user. The merge engine 480 is configured to reconstruct the original image using the restored and/or colorized images and/or restored text components. The reconstructed original image is returned as an output 482 to the user.

In some embodiments, optical character recognition ("OCR") is performed on text components of a mixed image-and-text image and natural language processing techniques are utilized to identify a topic of interest or other information from the OCR text. The obtained information may be fed to the colorization and/or restoration engines to train a specific instance of one or more components thereof based on the obtained information. For example, where the text yields information about a particular location, weights and/or parameters specific to the location are utilized when restoring and/or colorizing the image component.

Example User Interface

Figure 5A:
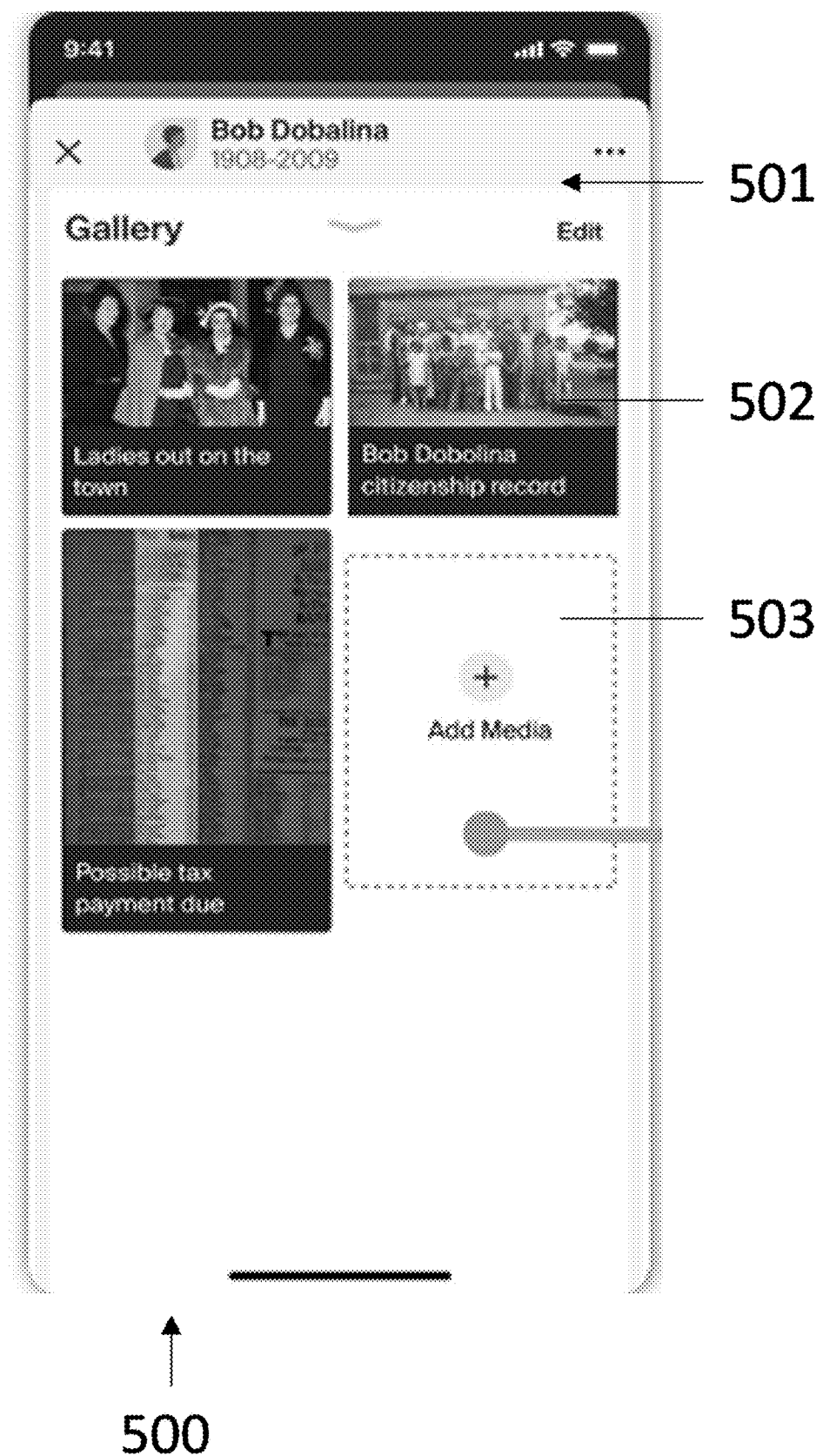
Figure 5B:
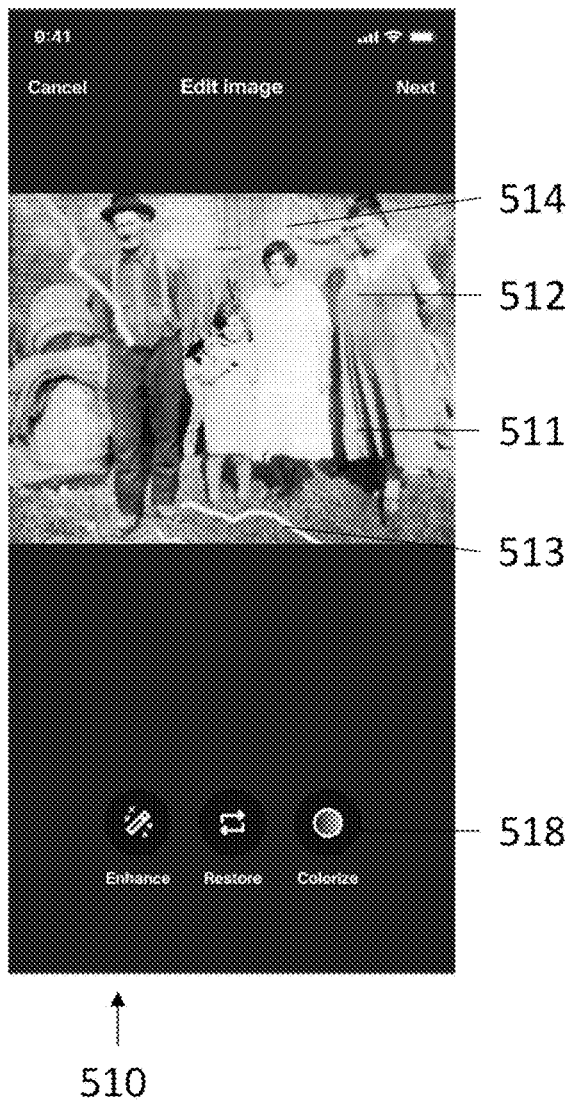

FIG. 5A is an example user interface for a user to perform image enhancement, in accordance with some embodiments. The user interface 500 may be an example of the user interface 115. The user interface 500 of a genealogical research service includes a photo gallery section 501 of a tree node in a genealogical tree. The photo gallery section 501 may include one or more images 502 and an option 503 for adding new images or other media. Upon clicking the option 503 or on one or more of the images 502, a user may be guided to a user interface 510 for enhancing an image, as shown in FIG. 5B. The user interface 510 includes an image section 512 and one or more options 518 for enhancing the image. The user may select one of the options 518, for example enhance (referring to both restoration and colorization), restore only, or colorize only. The options 518 may be represented by indicia pertaining to the options 518.

Figure 5C:

As seen in FIG. 5C, a review section 516 may be provided upon a user selection of one of the options 518, with before and after images shown. The user may select one of the review images, which may be shown in the review section 516 as thumbnail images, to see the image in more detail in the image section 512, whereupon the thumbnail image may be highlighted.

FIG. 5B shows the original image 511, which includes local damage 513 such as tears and cracks, as well as global damage 514 such as faded colors. FIG. 5C shows the image 511 with the enhance option performed thereon, wherein the local damage 513 and the global damage 514 have been rectified. FIG. 5C also shows the user interface where the indicium for the enhance option is highlighted. FIG. 5D shows the user interface where the indicium for the restore option is highlighted, and FIG. 5E shows the user interface where the indicium for the colorize option is highlighted.

FIG. 5F shows a user interface 550 in which a colorized version of a photo gallery image is automatically presented to a user as a card 552 in a daily feed, for example after the photo is automatically selected for colorization and colorized according to the disclosed embodiments or after selection for colorization by another user. Upon clicking on the card 552 or on a review button 554, a user interface 575 is presented, as shown in FIG. 5G, where a user may review the enhancements performed upon the image in an image section 572. The user may utilize a toggle 578 to discard the changes or apply the changes (e.g., keep the changes).

Additional Example of Image Enhancement Pipeline

Figure 6:
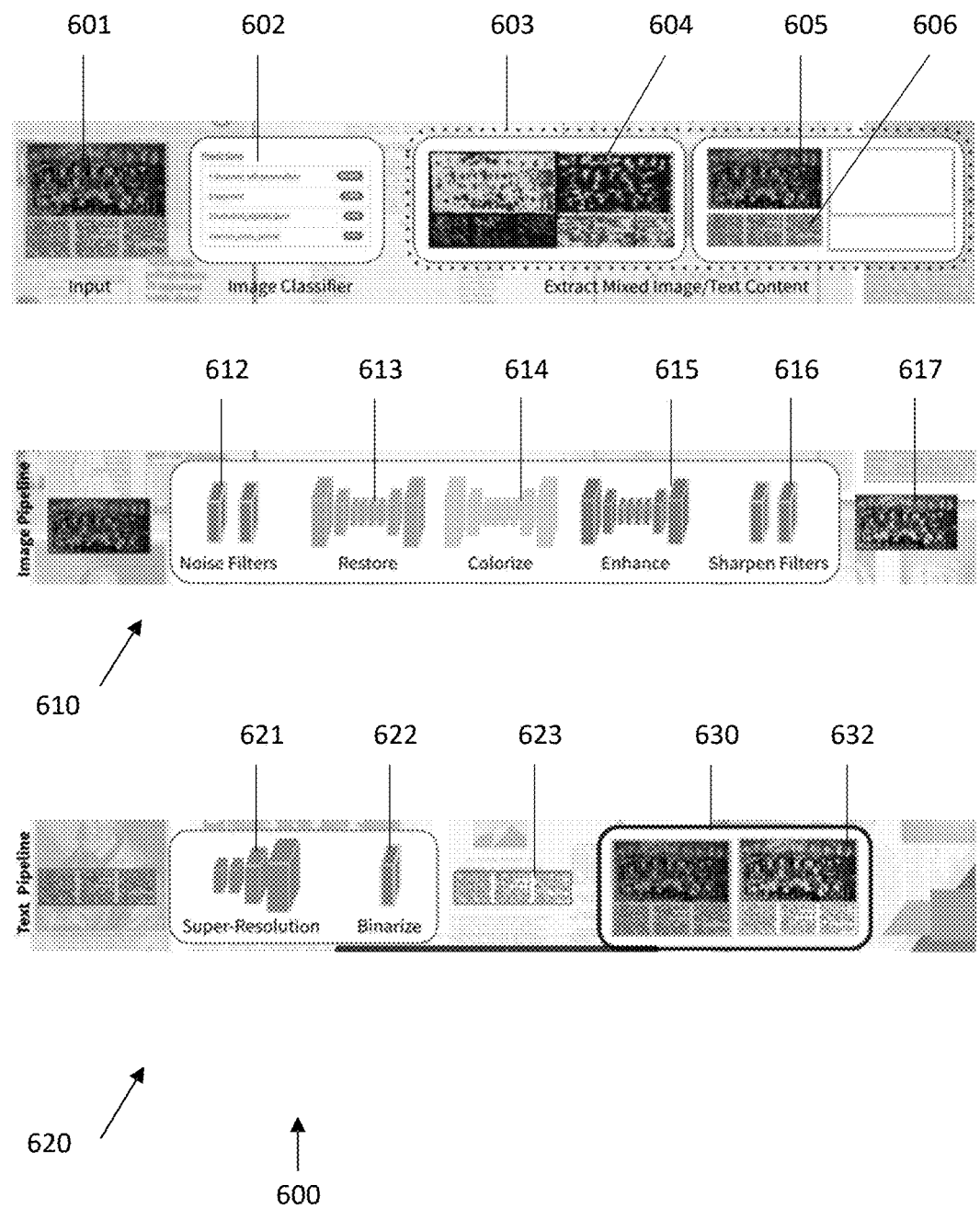
FIG. 6 shows an additional example embodiment of image enhancement pipeline, in accordance with some embodiments.

FIG. 6 shows an additional example embodiment of image enhancement pipeline, in accordance with some embodiments. The pipeline 600 includes an input 601 which may be any suitable image or other input. The image may be a mixed image and text image, such as a newspaper, magazine, yearbook, illustrated book, family history book, or other mixed image, an image-only image, a text-only image, or otherwise. The image 601 may be classified using a suitable classifier engine 602. The image 601 may be passed to an engine 603 for extracting or segmenting mixed image/text content 604. In some embodiments, the image component 605 and the text component 606 of a mixed image-and-text image are extracted so as to be treated separately using image- and text-specific modalities, respectively. In some embodiments, the images are restored prior to colorization, as this has been found to improve the results of the colorization engine.

In an image-treatment pipeline 610, one or more noise filters 612, a restore engine 613, a colorize engine 614, an enhance engine 615, and one or more sharpen filters 616. The restore engine 613 and the colorize engine 614 may operate upon an input image only as specified by a user request or as otherwise determined, with the enhance engine 615 representing images passed through both the restore engine 613 and the colorize engine 614. In some embodiments, the one or more noise filters 612 may be replaced with a light correction engine. In some embodiments, an image normalization procedure is performed between the restore engine 613 and the colorize engine 614. In some embodiments, the one or more sharpen filters 616 is replaced with a resizing engine configured to restore edges to the images. A restored and/or colorized image-only image 617 is output.

In a text-restoration pipeline 620, a super-resolution engine 621 is provided followed by a binarization engine 622. The super-resolution engine 621 may be replaced in some embodiments by a text restoration engine configured similar to the embodiment described regarding FIGS. 4A-4D. A restored text-only image 623 is output.

The restored image-only image 617 and the restored text-only image 623 may be re-assembled or reconstructed into a mixed image-and-text image 632, which is shown side-by-side with the original image 630.

Image Enhancement Processes

Figure 7A:
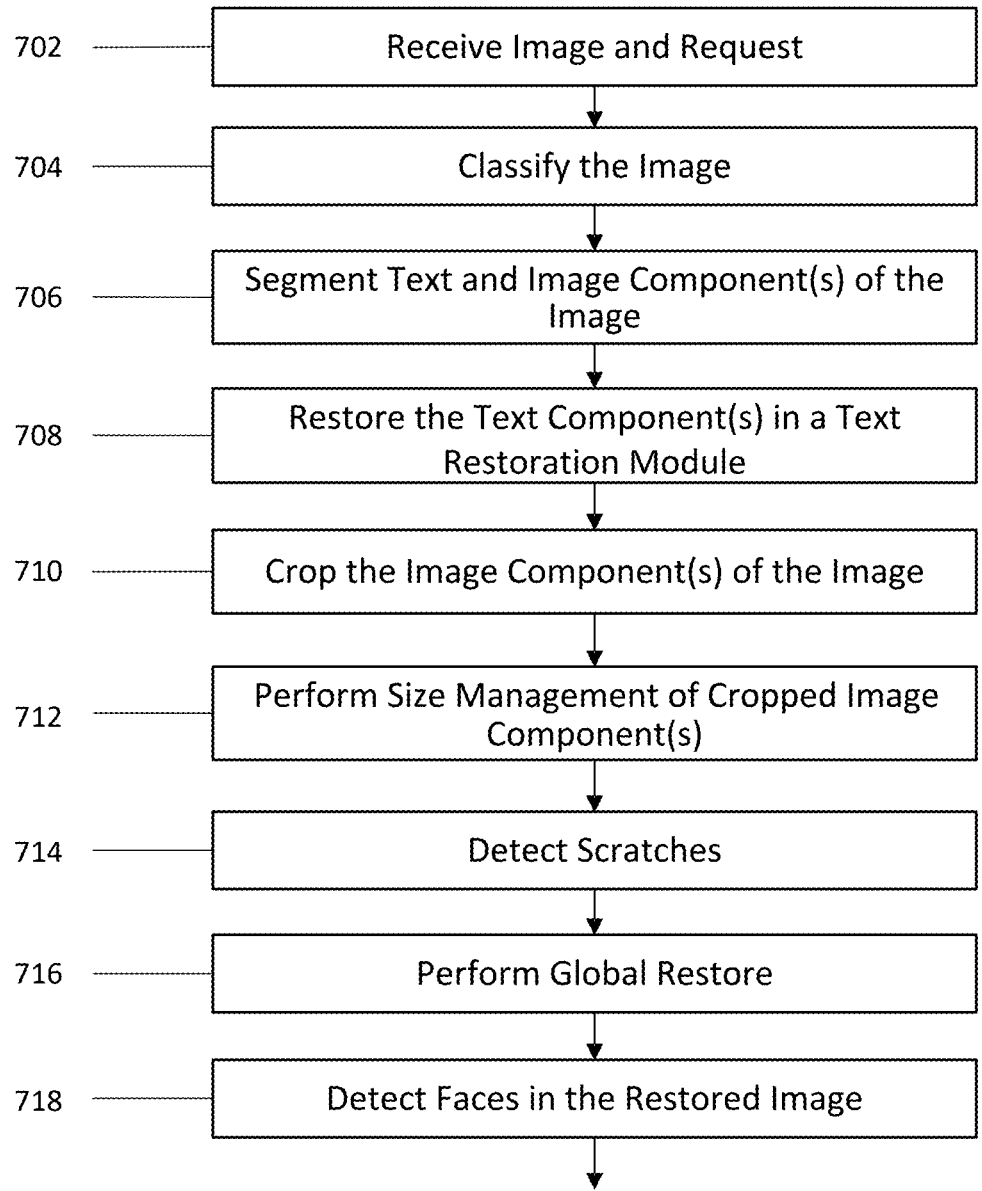
FIG. 7A through 7C illustrates various exemplary methods for image enhancement according to an embodiment of the disclosure.
Figure 7B:
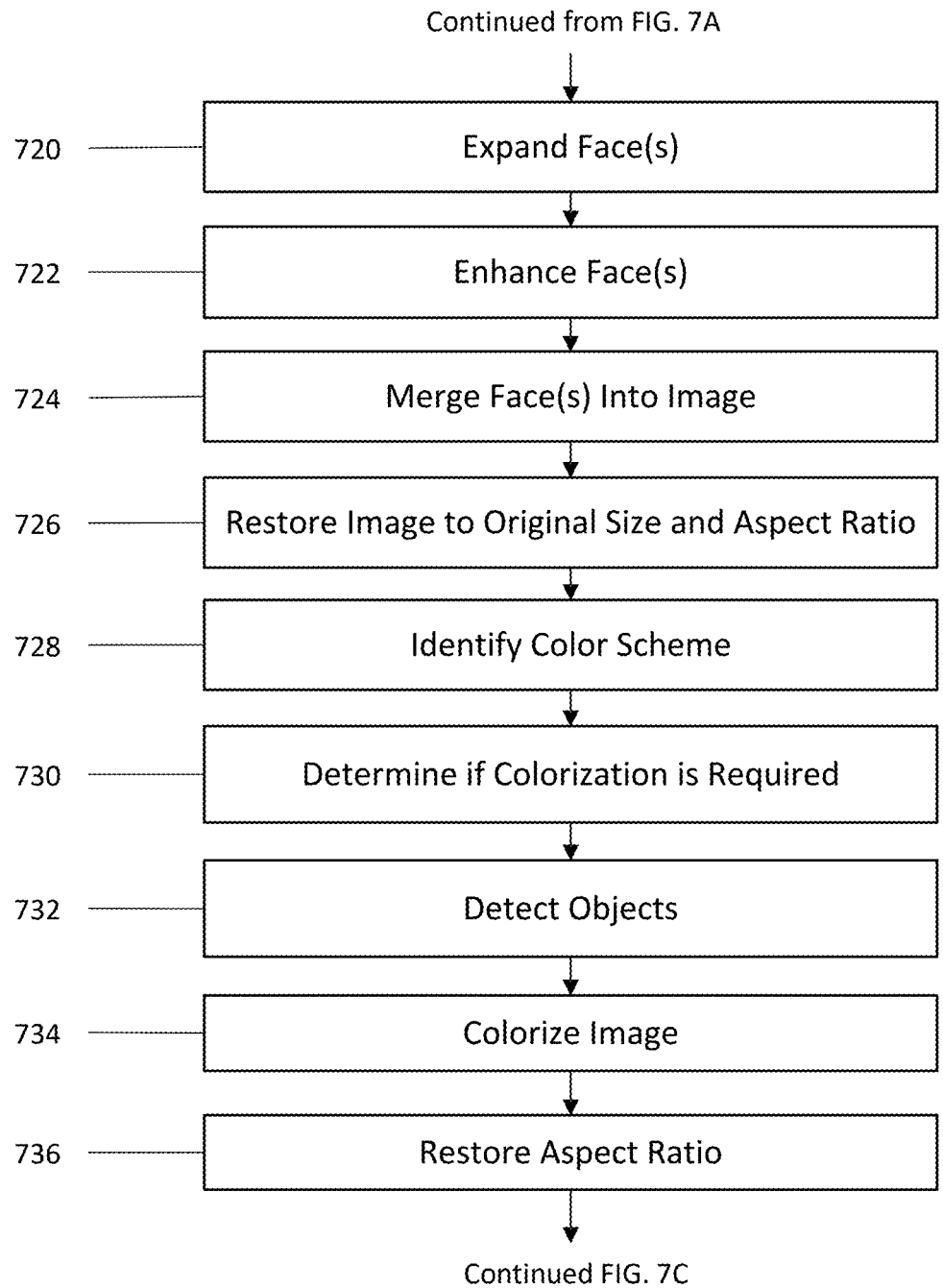
Figure 7C:
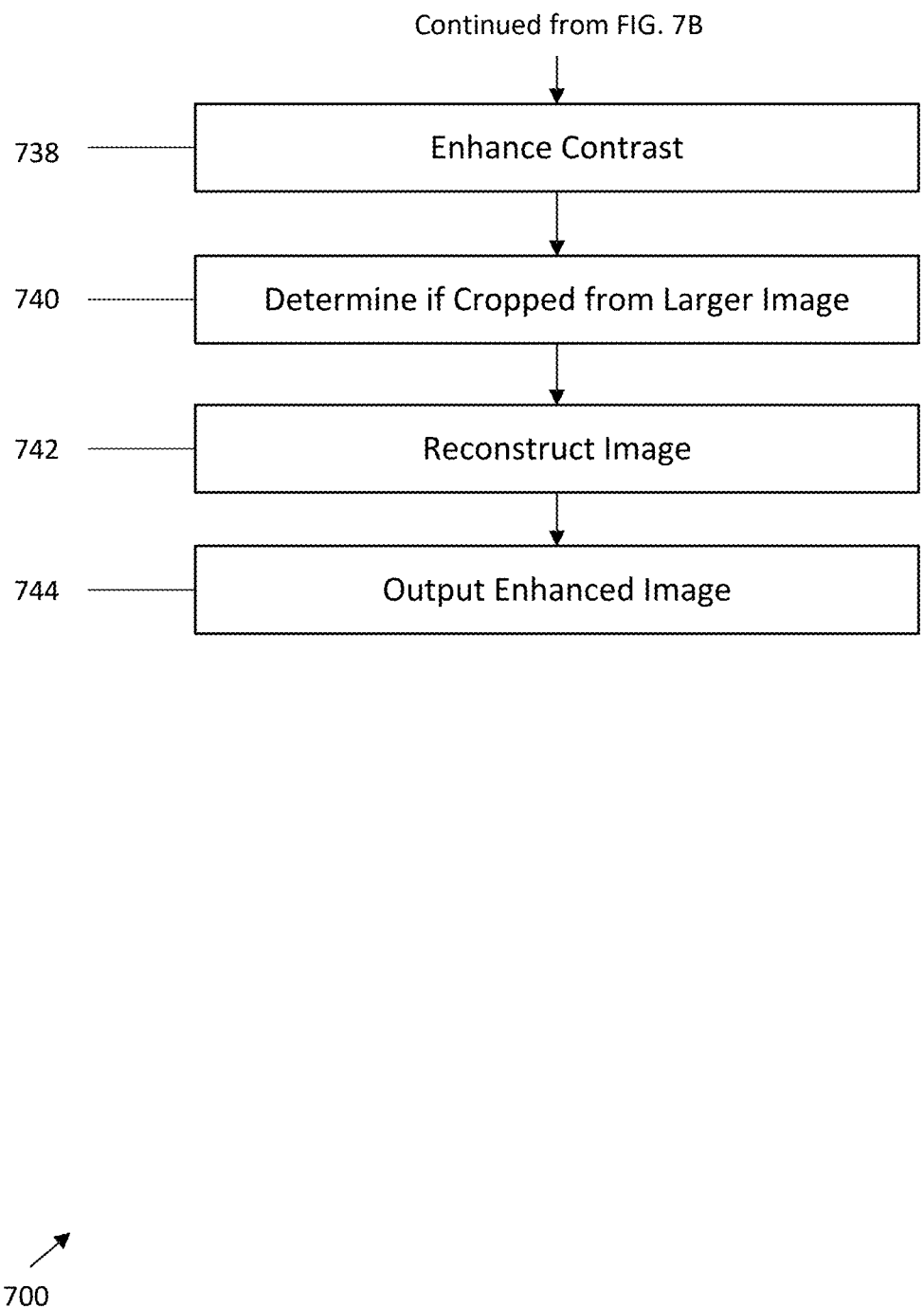

FIGS. 7A-7C illustrate various exemplary methods for image enhancement according to an embodiment of the disclosure. A step 702 includes receiving an image and optionally a user request, such as to restore, colorize, or enhance (restore+colorize). A step 704 includes classifying the image so that appropriate problem-specific modalities may be applied thereto. The step 704 may involve classifying the image as text+image, text only, image only, multiple images, etc.

A step 706 includes segmenting, where appropriate, mixed text-and-image images to yield distinct text component(s) and image component(s) of the image for separate, problem-specific restoration. A step 708 includes, where appropriate, restoring the text component(s) in a text restoration engine. A step 710 includes, where appropriate, cropping the image component(s) of the image into, for example, distinct images from a multi-image image, or removing borders or other noise from around one or more images.

A step 712 includes performing size management of cropped image component where the images are to be restored and where the size is above a predetermined threshold. This may include downsampling the cropped image component to a suitable resolution. A step 714 includes detecting scratches and a step 716 includes, where appropriate, performing a global restoration process.

A step 718 includes detecting faces in the globally restored image. Where detected, faces may be expanded in a step 720, enhanced in a step 722, and merged back into the globally restored image 724. The globally restored image with the merged-in enhanced face(s) is restored to an original size and aspect ratio in a step 726.

Where appropriate, a color scheme for the restored image is identified 728, and after, in a step 730, colorization is determined to be required, steps including object detection 732, image colorization 734, restoring an aspect ratio 736, and enhancing contrast 738 is performed.

In a step 740, a determination is made whether a restored and colorized image is cropped from a larger image. In a step 742 the restored and colorized image is reconstructed into the original image, for example with a separately restored text component, after which the restored and/or colorized image is output in a step 744.

Example Architecture of Machine Learning Models

In various embodiments, a wide variety of machine learning models may be used in the image enhancement pipeline, such as text restoration engine 422, image restore engine 434, face enhancement engine 440, object detection engine 460, colorization engine 462, and other engines for other uses described herein. The machine learning models include but are not limited to decision trees, decision forests, support vector machines (SVMs), regression models, Bayesian networks, genetic algorithms, and deep learning models. The machine learning models may be trained using different methods including but not limited to supervised learning, unsupervised learning, self-supervised learning, and semi-supervised learning. Deep learning models that may also be used include but not limited to neural networks, including fully-connected neural networks, spiking neural networks, convolutional neural networks (CNN), deep belief networks, Boltzmann machines, autoencoder networks, generative adversarial network GAN, variational-autoencoder (VAE), recurrent neural networks (RNN) (e.g., long short-term memory networks (LSTM)), and transformer neural networks.

Figure 8:
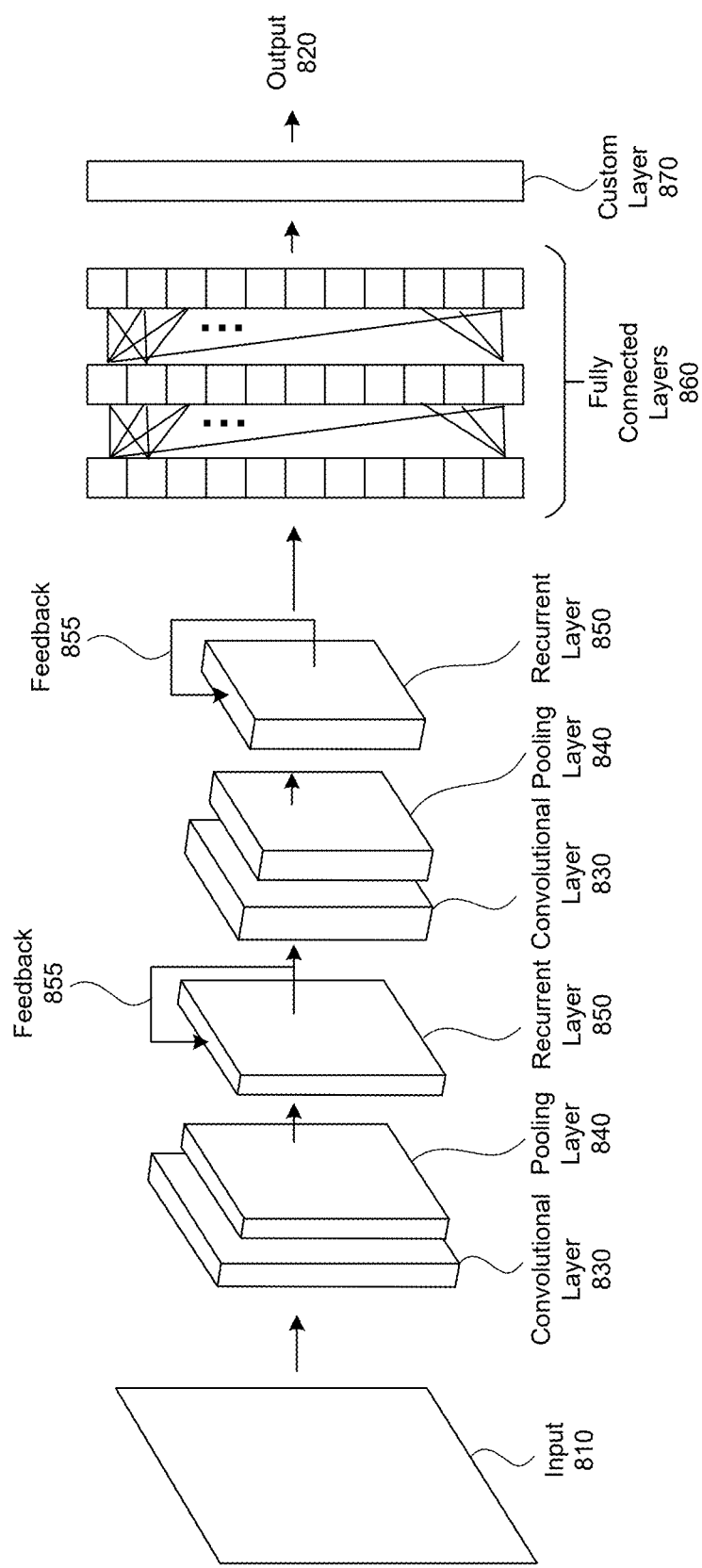
FIG. 8 shows an example structure of a machine learning model, in accordance with some embodiments.

FIG. 8 shows an example structure of a neural network, which may include layers that may present in various machine learning models. For example, a CNN may include the convolutional layers and the pooling layers shown in FIG. 8. An LSTM may include the recurrent layers shown in FIG. 8. Each machine learning models may have its own structure and layers (while omitting some layers in FIG. 8). The order of the layers in FIG. 8 is also an example. The order of layers may change, depending on the type of machine learning model used.

Referring to FIG. 8, a structure of an example neural network (NN) is illustrated, according to an embodiment. The NN 800 may receive an input 810 and generate an output 820. The NN 800 may include different kinds of layers, such as convolutional layers 830, pooling layers 840, recurrent layers 850, full connected layers 860, and custom layers 870. A convolutional layer 830 convolves the input of the layer (e.g., an image) with one or more kernels to generate different types of images that are filtered by the kernels to generate feature maps. Each convolution result may be associated with an activation function. A convolutional layer 830 may be followed by a pooling layer 840 that selects the maximum value (max pooling) or average value (average pooling) from the portion of the input covered by the kernel size. The pooling layer 840 reduces the spatial size of the extracted features. In some embodiments, a pair of convolutional layer 830 and pooling layer 840 may be followed by a recurrent layer 850 that includes one or more feedback loop 855. The feedback 855 may be used to account for spatial relationships of the features in an image or temporal relationships of the objects in the image. The layers 830, 840, and 850 may be followed in multiple fully connected layers 860 that have nodes (represented by squares in FIG. 8) connected to each other. The fully connected layers 860 may be used for classification and object detection. In one embodiment, one or more custom layers 870 may also be presented for the generation of a specific format of output 820. For example, a custom layer may be used for image segmentation for labeling pixels of an image input with different segment labels.

The order of layers and the number of layers of the NN 800 in FIG. 8 is for example only. In various embodiments, a NN 800 includes one or more convolutional layers 830 but may or may not include any pooling layer 840, recurrent layer 850, or fully connected layers 860. If a pooling layer 840 is present, not all convolutional layers 830 are always followed by a pooling layer 840. A recurrent layer may also be positioned differently at other locations of the CNN. For each convolutional layer 830, the sizes of kernels (e.g., 3×3, 5×5, 7×7, etc.) and the numbers of kernels allowed to be learned may be different from other convolutional layers 830.

A machine learning model may include certain layers, nodes, kernels and/or coefficients. Training of a neural network, such as the NN 800, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

One or more machine learning models described herein may bear the structure described in FIG. 8.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. Details of specific training, training samples, and loss function are described throughout the specification.

Computing Machine Architecture

Figure 9:
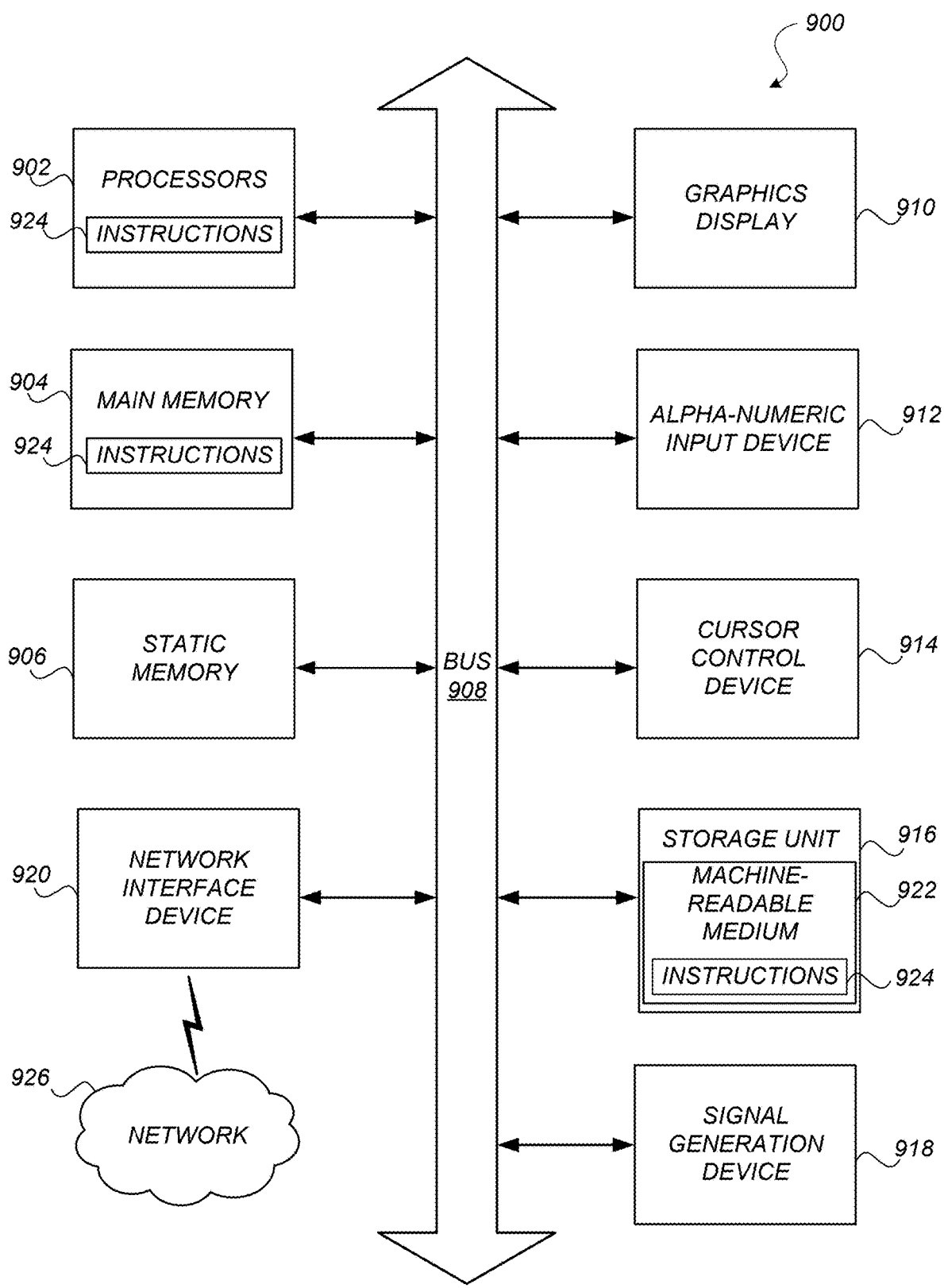
FIG. 9 is a block diagram of an example computing device, in accordance with some embodiments.

FIG. 9 is a block diagram illustrating components of an example computing machine that is capable of reading instructions from a computer-readable medium and execute them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the client device 110, the computing server 130, and various engines, interfaces, terminals, and machines shown in FIG. 2, including the image enhancement engine 265. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 may also include a memory 904 that store computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 902 and reduces the space required for the memory 904. For example, the image processing techniques and machine learning methods described herein reduce the complexity of the computation of the processors 902 by applying one or more novel techniques that simplify the steps in training, reaching convergence, and generating results of the processors 902. The algorithms described herein also reduces the size of the models and datasets to reduce the storage space requirement for memory 904.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 may also include alphanumeric input device 912 (e.g., a keyboard), a cursor control device 914 (e.g., a mouse, a trackball, a joystick, a motion sensor, or other pointing instruments), a storage unit 916 (a hard drive, a solid-state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Patent Publication Application No., entitled "Linking Individual Datasets to a Database," US2021/0216556, published on Jul. 15, 2021, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
   receiving, by a genealogy server, an image that is digitalized from a physical record, the image associated with a genealogy record or an individual profile of the genealogy server;
   identifying a sub-region of the image as a target region for image enhancement;
   classifying that the sub-region includes a type of image component;
   enhancing the sub-region based on the classified type of the image component to generate an enhanced sub-region, enhancing the sub-region comprising restoring or colorizing the image component, wherein enhancing the sub-region is performed at least partially by a machine learning model and the machine learning model comprises a generative adversarial network that is trained using a plurality of image records stored in the genealogy server and faux-real images generated by randomly oversaturating real images; and
   merging the enhanced sub-region with one or more other sub-regions or an original version of the image.

2. The computer-implemented method of claim 1, wherein the type of image component is selected from candidate types of image components, the candidate types comprise a text component, a single image component, a multi-image component, and a face component.

3. The computer-implemented method of claim 1, wherein the image enhancement comprises a combination of image enhancing techniques that are selectable by a user via a graphical user interface.

4. The computer-implemented method of claim 1, wherein enhancing the sub-region based on the classified type of the image component comprises:
   selecting a set of image processing techniques according to the classified type, wherein the set of image processing techniques is predetermined for the classified type; and
   applying the set of image processing techniques to the sub-region.

5. The computer-implemented method of claim 4, wherein selecting the set of image processing techniques is further based on a user's request on the image enhancement.

6. The computer-implemented method of claim 1, wherein the machine learning model comprises a generative adversarial network that is trained using faux-real images generated by randomly oversaturating a set of real images by a percentage within a predetermined range.

7. The computer-implemented method of claim 1, further comprising:
   segmenting a text component from an image component of the image; and
   performing text restoration separately from image restoration and/or colorization.

8. The computer-implemented method of claim 1, wherein enhancing the sub-region comprises restoring the image component, and restoring the image component comprises:
   determining that a size of the image exceeds a predetermined size threshold;
   adjusting the size of the image;
   performing image restoration on the image component;
   merging restored image component into the original version of the image that has the size adjusted; and
   restoring an original image size and aspect ratio.

9. The computer-implemented method of claim 1, wherein enhancing the sub-region comprises performing a facial enhancement, and performing the facial enhancement comprises:
   detecting a face is present in the sub-region;
   expanding the face;
   selecting an image-processing machine learning model that is trained specifically for enhancing faces; and
   enhancing an expanded face using the image-processing machine learning model.

10. The computer-implemented method of claim 1, wherein enhancing the sub-region comprising colorizing the image component, and colorizing the image component comprises:
    identify a color scheme of the image component; and
    colorizing the image component based on the color scheme.

11. The computer-implemented method of claim 1, further comprising:
    determining that an enhanced image component was cropped from a larger image; and
    merging the enhanced image component into the larger image.

12. A system comprising:
    one or more processors; and
    memory configured to store code comprising instructions, the instructions, when executed by the one or more processors, cause the one or more processors to perform steps comprising:
        receiving an image that is digitalized from a physical record, the image associated with a genealogy record or an individual profile of a genealogy server;
        identifying a sub-region of the image as a target region for image enhancement;
        classifying that the sub-region includes a type of image component;
        enhancing the sub-region based on the classified type of the image component to generate an enhanced sub-region, enhancing the sub-region comprising restoring or colorizing the image component, wherein enhancing the sub-region is performed at least partially by a machine learning model and the machine learning model is trained using a plurality of image records stored in the genealogy server, and wherein enhancing the sub-region comprises restoring the image component by:
- adjusting a size of the image in response to determining that the size of the image exceeds a predetermined size threshold;
- generating a modified image by merging a restored image component into the image that has the size adjusted; and
- restoring the modified image to an original image size and an original image aspect ratio; and
- merging the enhanced sub-region with one or more other sub-regions or an original version of the image.

13. The system of claim 12, wherein the type of image component is selected from candidate types of image components, the candidate types comprise a text component, a single image component, a multi-image component, and a face component.

14. The system of claim 12, wherein the image enhancement comprises a combination of image enhancing techniques that are selectable by a user via a graphical user interface.

15. The system of claim 12, wherein enhancing the sub-region based on the classified type of the image component comprises:
- selecting a set of image processing techniques according to the classified type, wherein the set of image processing techniques is predetermined for the classified type; and
- applying the set of image processing techniques to the sub-region.

16. The system of claim 15, wherein selecting the set of image processing techniques is further based on a user's request on the image enhancement.

17. The system of claim 12, wherein the machine learning model comprises a generative adversarial network that is trained using faux-real images generated by randomly oversaturating real images.

18. The system of claim 12, further comprising:
- segmenting a text component from an image component of the image; and
- performing text restoration separately from image restoration and/or colorization.

19. The system of claim 12, wherein enhancing the sub-region comprises performing a facial enhancement, and the facial enhancement comprises:
- detecting a face is present in the sub-region;
- expanding the face;
- selecting an image-processing machine learning model that is trained specifically for enhancing faces; and
- enhancing an expanded face using the image-processing machine learning model.

20. A system comprising:
- a graphical user interface configured to:
  - provide a user an interface to upload an image that is digitalized from a physical record; and
  - receive one or more options from the user on image enhancement of the image; and
- a genealogy server in communication with the graphical user interface, the genealogy server comprising one or more processors and memory, the memory configured to store code comprising instructions, the instructions, when executed by the one or more processors, cause the one or more processors to perform steps comprising:
  - receiving the image, the image to be associated with a genealogy record or an individual profile of the genealogy server;
  - identifying a sub-region of the image as a target region for image enhancement;
  - classifying that the sub-region includes a type of image component;
  - enhancing the sub-region based on the classified type of the image component to generate an enhanced sub-region, enhancing the sub-region comprising restoring or colorizing the image component, wherein enhancing the sub-region is performed at least partially by a machine learning model and the machine learning model is trained using a plurality of image records stored in a genealogy server, and wherein enhancing the sub-region comprises performing a facial enhancement by:
    - expanding a face detected in the sub-region; and
    - enhancing the expanded face using an image-processing machine learning model that is trained specifically for enhancing faces; and
  - merging the enhanced sub-region with one or more other sub-regions or an original version of the image.

* * * * *